(12) United States Patent
Kawamata et al.

(10) Patent No.: US 12,737,889 B2
(45) Date of Patent: Sep. 15, 2026

(54) CELL IMAGE ANALYSIS SYSTEM, CELL IMAGE ANALYSIS APPARATUS AND CELL IMAGE ANALYSIS METHOD

(71) Applicant: SHIMADZU CORPORATION, Kyoto (JP)

(72) Inventors: Shin Kawamata, Kobe (JP); Takako Yamamoto, Kobe (JP); Takashi Suzuki, Kyoto (JP); Ryuji Sawada, Kyoto (JP); Shuhei Yamamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 360 days.

(21) Appl. No.: 18/687,570

(22) PCT Filed: Aug. 22, 2022

(86) PCT No.: PCT/JP2022/031535
§ 371 (c)(1),
(2) Date: Apr. 4, 2024

(87) PCT Pub. No.: WO2023/032730
PCT Pub. Date: Mar. 9, 2023

(65) Prior Publication Data

US 2024/0428412 A1 Dec. 26, 2024

(30) Foreign Application Priority Data

Aug. 30, 2021 (JP) ................................ 2021-140369

(51) Int. Cl.
*G06T 7/00* (2017.01)
*C12M 1/34* (2006.01)
(Continued)

(52) U.S. Cl.
CPC .............. *G06T 7/0014* (2013.01); *G06T 7/62* (2017.01); *G06T 11/00* (2013.01);
(Continued)

(58) Field of Classification Search
CPC ......... G06T 7/0014; G06T 7/62; G06T 11/00; G06T 2207/20081; G06T 2207/30024;
(Continued)

(56) References Cited

U.S. PATENT DOCUMENTS

2008/0015786 A1* 1/2008 Ramer ................... G06V 20/69 702/19
2008/0318314 A1* 12/2008 Fulga .................. C12N 5/0618 435/373

FOREIGN PATENT DOCUMENTS

CN 101072881 A * 11/2007 ............. C12M 1/34
JP 6694240 B 5/2020
WO 2020/188813 A1 9/2020

OTHER PUBLICATIONS

Nogami, Ken and Kazuaki Nagayama. "Changes in cellular traction forces, motilities and mechanical properties in vascular smooth muscle cells through cell de-differentiation and cell senescence." The Proceedings of the JSME Conference on Frontiers in Bioengineering (2020) (Year: 2020).*

(Continued)

*Primary Examiner* — Charlotte M Baker
*Assistant Examiner* — Dustin Bilodeau
(74) *Attorney, Agent, or Firm* — Sughrue Mion, PLLC

(57) ABSTRACT

A cell image analysis system (200) according to this invention includes a cell image acquirer (11) configured to acquire a cell image (30) including cells (90); a cell area acquirer (12) configured to acquire cell areas (91) from the cell image; a pseudopodium area acquirer (13) configured to acquire areas (92) of pseudopodia (**90*b***) that are elongated
(Continued)

areas in the cell areas of the cell image; and an aging index information acquirer (14) configured to acquire aging index information (24) that indicates a degree of aging of the cells based lengths of pseudopodia.

16 Claims, 13 Drawing Sheets

(51) Int. Cl.
*G06T 7/62* (2017.01)
*G06T 11/00* (2026.01)

(52) U.S. Cl.
CPC ............... *G06T 2207/20081* (2013.01); *G06T 2207/30024* (2013.01); *G06T 2210/41* (2013.01)

(58) Field of Classification Search
CPC ............... G06T 2210/41; G06T 7/0012; G06T 2207/10056; G06T 2207/20084; G01N 33/48; C12M 1/34; C12Q 1/04
USPC ........................................................ 382/133
See application file for complete search history.

(56) References Cited

OTHER PUBLICATIONS

Communication dated Apr. 22, 2025 in Japanese Application No. 2021-140369.

Kenzo Nogami et al., "Changes in cellular traction forces, motilities and mechanical properties in vascular smooth muscle cells though cell de-differentiation and cell senescence.", Lecture Paper Collection of the 31 Biofrontier Lecture of the Japan Society of Mechanical Engineers, Dec. 8, 2020, 2A26, pp. 1-4, ISSN 1348-2939.

International Search Report for PCT/JP2022/031535 dated Nov. 8, 2022 (PCT/ISA/210).

Written Opinion for PCT/JP2022/031535 dated Nov. 8, 2022 (PCT/ISA/237).

* cited by examiner

200
REQUEST
130
100
CELL IMAGE ANALYSIS APPARATUS
110
COMPUTER
111
DISPLAY
112
INPUT
110
COMPUTER
120
IMAGING APPARATUS
120
IMAGING APPARATUS
80
SUPERIMPOSED CELL IMAGE
24
AGING INDEX INFORMATION
30
CELL IMAGE
PROCESSOR
10
STORAGE
20
PROGRAM
21
IMAGE DATA
22
CELL IMAGE
30
SUPER-IMPOSED CELL IMAGE
80
LEARNED MODEL
23
AGING INDEX INFORMATION
24
PSEUDOPODIUM LENGTH DISTRIBUTION
24a
INDEX VALUE
24b

S3
ACQUISITION OF PSEUDOPODIUM AREA
S3a
ACQUIRE CELL AREA IMAGE
S3b
REDUCTION
S3c
EXPANSION
S3d
ACQUIRE PSEUDOPODIUM AREA
S3e
NOISE REMOVAL
S3f
STORE PSEUDOPODIUM AREA
RETURN
CELL AREA IMAGE
90
31
CELL AREA IMAGE (AFTER REDUCTION)
31a
PSEUDOPODIUM REMOVAL IMAGE
32
PSEUDOPODIUM AREA IMAGE
92
90b
33
PSEUDOPODIUM AREA IMAGE (AFTER NOISE REMOVAL)
33a

FIG.7

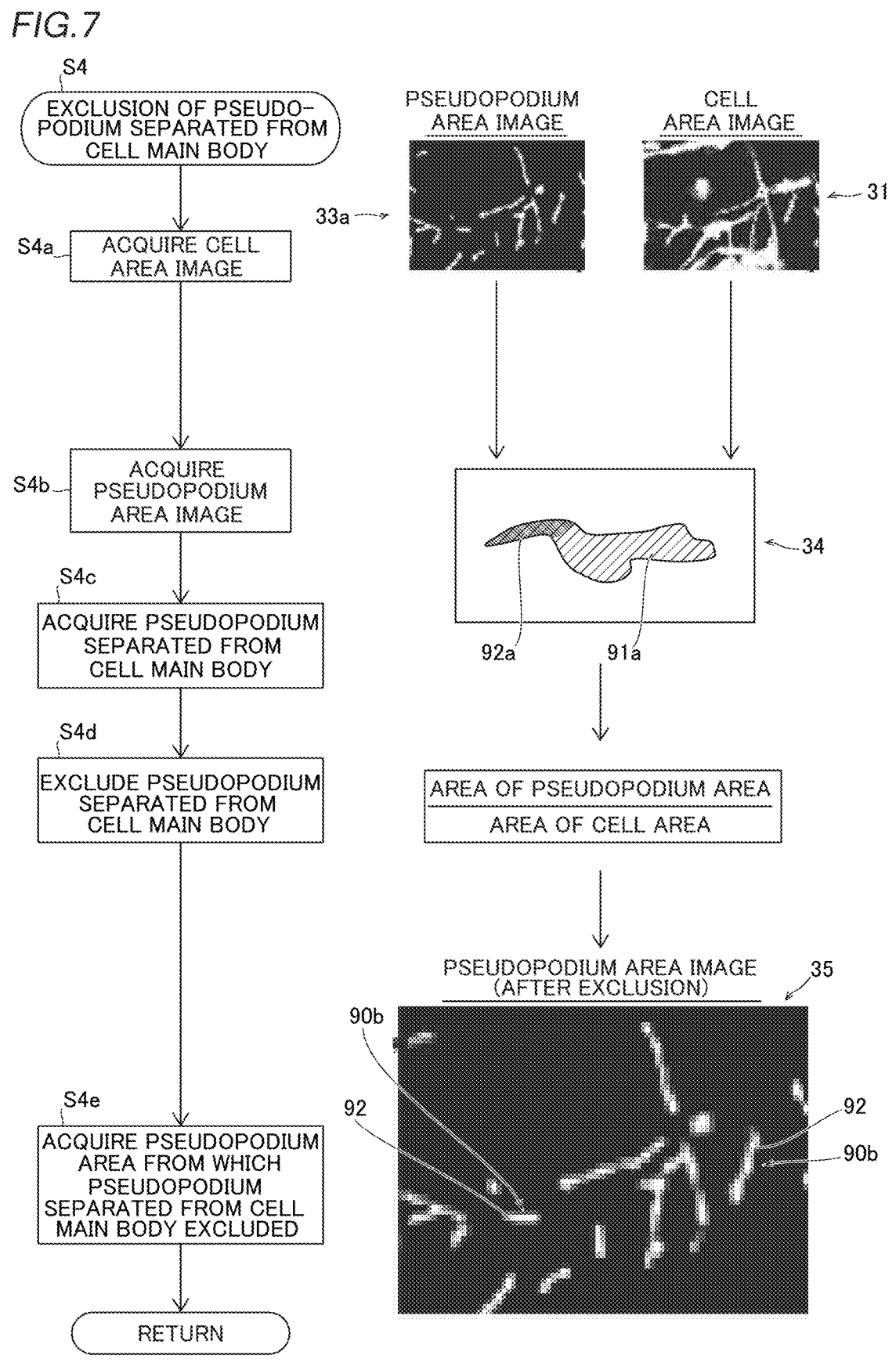

S4 EXCLUSION OF PSEUDO-PODIUM SEPARATED FROM CELL MAIN BODY

S4a ACQUIRE CELL AREA IMAGE

S4b ACQUIRE PSEUDOPODIUM AREA IMAGE

S4c ACQUIRE PSEUDOPODIUM SEPARATED FROM CELL MAIN BODY

S4d EXCLUDE PSEUDOPODIUM SEPARATED FROM CELL MAIN BODY

S4e ACQUIRE PSEUDOPODIUM AREA FROM WHICH PSEUDOPODIUM SEPARATED FROM CELL MAIN BODY EXCLUDED

RETURN

PSEUDOPODIUM AREA IMAGE

33a

CELL AREA IMAGE

31

34

92a

91a $$\frac{\text{AREA OF PSEUDOPODIUM AREA}}{\text{AREA OF CELL AREA}}$$

PSEUDOPODIUM AREA IMAGE (AFTER EXCLUSION)

35

90b

92

92

90b

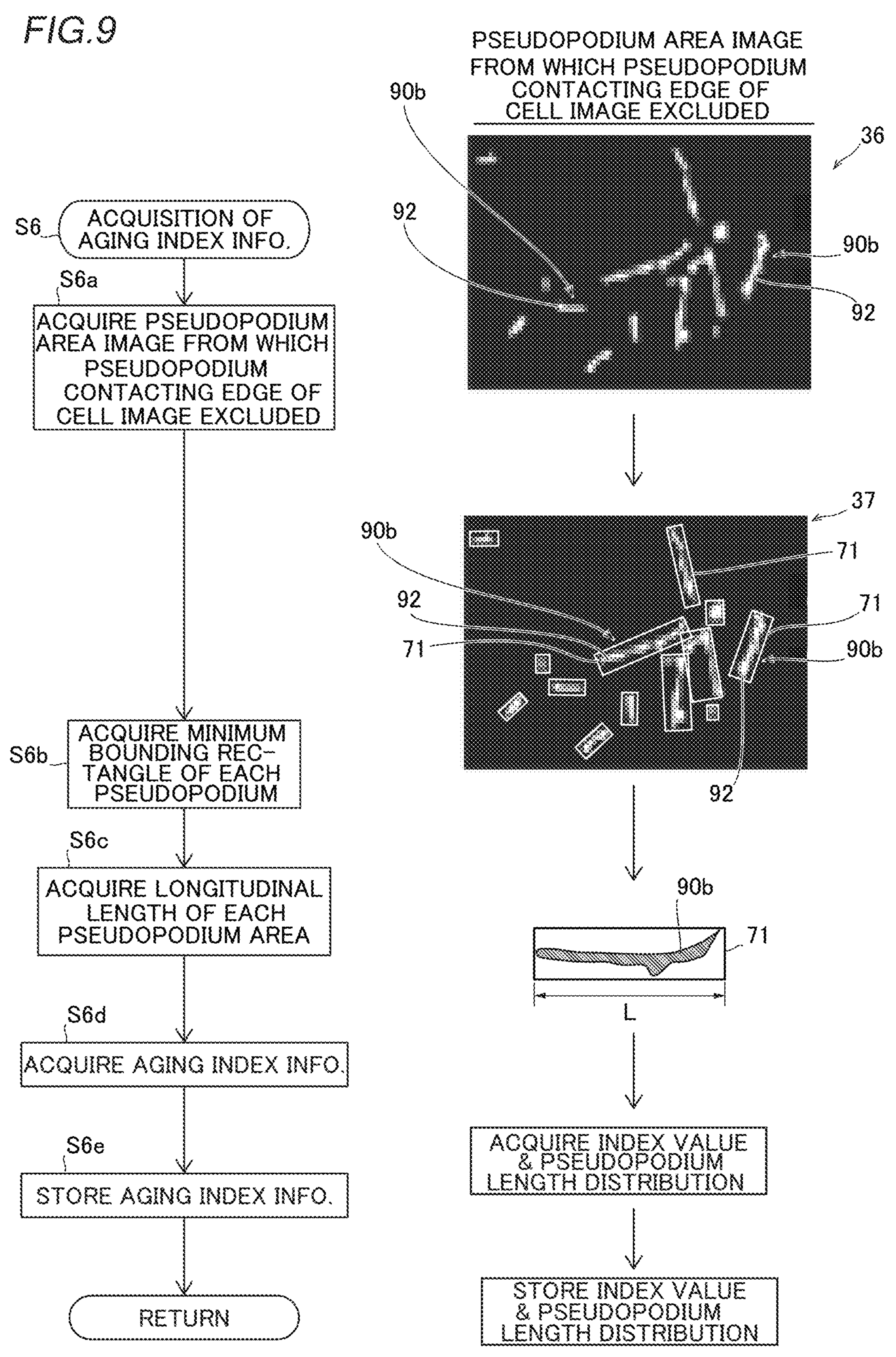
FIG.9
S6
ACQUISITION OF AGING INDEX INFO.
S6a
ACQUIRE PSEUDOPODIUM AREA IMAGE FROM WHICH PSEUDOPODIUM CONTACTING EDGE OF CELL IMAGE EXCLUDED
S6b
ACQUIRE MINIMUM BOUNDING REC-TANGLE OF EACH PSEUDOPODIUM
S6c
ACQUIRE LONGITUDINAL LENGTH OF EACH PSEUDOPODIUM AREA
S6d
ACQUIRE AGING INDEX INFO.
S6e
STORE AGING INDEX INFO.
RETURN
PSEUDOPODIUM AREA IMAGE FROM WHICH PSEUDOPODIUM CONTACTING EDGE OF CELL IMAGE EXCLUDED
36
90b
92
37
71
L
ACQUIRE INDEX VALUE & PSEUDOPODIUM LENGTH DISTRIBUTION
STORE INDEX VALUE & PSEUDOPODIUM LENGTH DISTRIBUTION

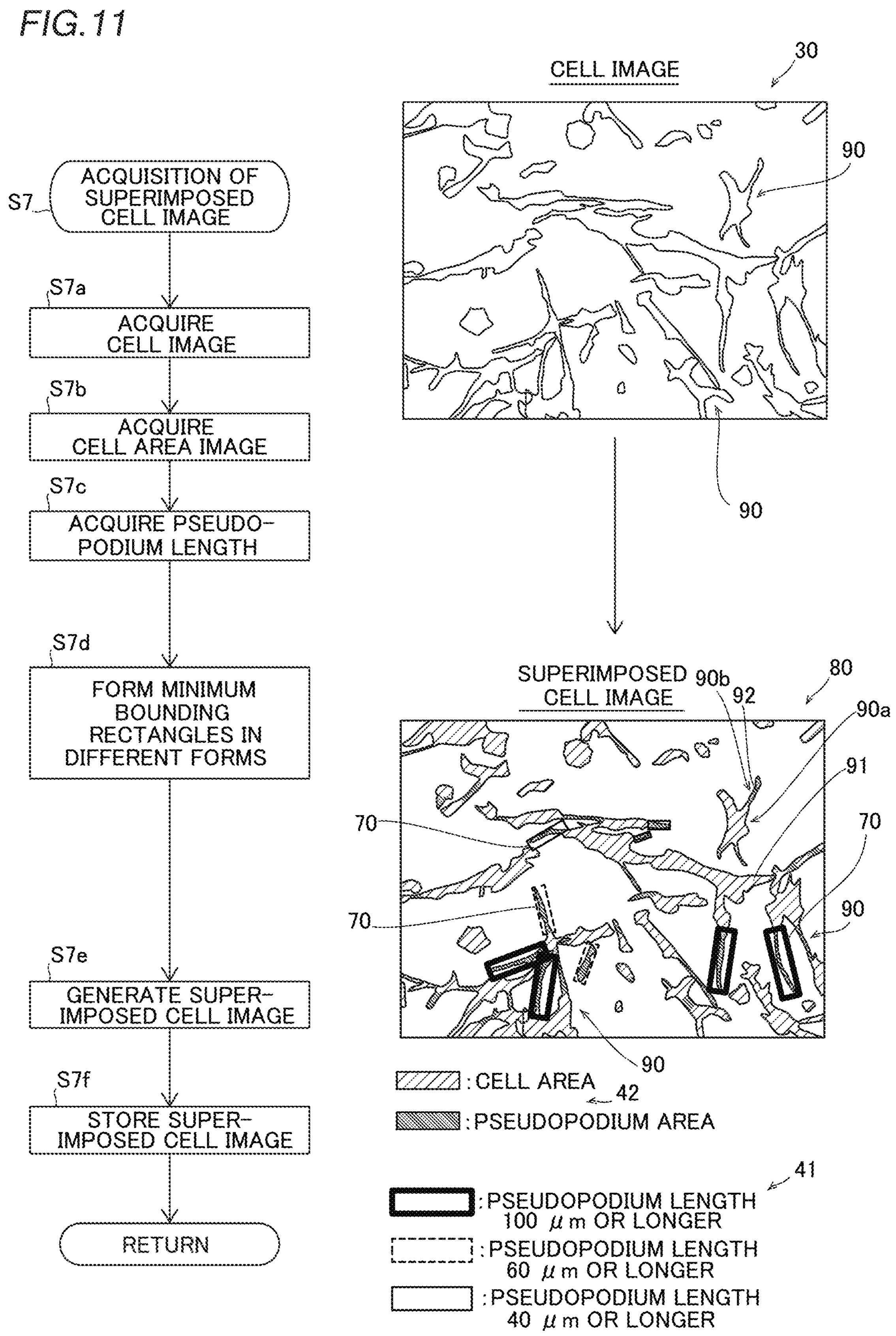
FIG.11
S7
ACQUISITION OF SUPERIMPOSED CELL IMAGE
S7a
ACQUIRE CELL IMAGE
S7b
ACQUIRE CELL AREA IMAGE
S7c
ACQUIRE PSEUDO-PODIUM LENGTH
S7d
FORM MINIMUM BOUNDING RECTANGLES IN DIFFERENT FORMS
S7e
GENERATE SUPER-IMPOSED CELL IMAGE
S7f
STORE SUPER-IMPOSED CELL IMAGE
RETURN
CELL IMAGE
30
90
90
SUPERIMPOSED CELL IMAGE
80
90b
92
90a
91
70
70
70
90
90
: CELL AREA
42
: PSEUDOPODIUM AREA
41
: PSEUDOPODIUM LENGTH 100 μm OR LONGER
: PSEUDOPODIUM LENGTH 60 μm OR LONGER
: PSEUDOPODIUM LENGTH 40 μm OR LONGER 111a
SUPERIMPOSED CELL IMAGE
90b
92
91
90a
90
70
80
90
41
42
: CELL AREA
: PSEUDO-PODIUM AREA
: PSEUDOPODIUM LENGTH 100 μM OR LONGER
: PSEUDOPODIUM LENGTH 60 μM OR LONGER
: PSEUDOPODIUM LENGTH 40 μM OR LONGER
PSEUDOPODIUM LENGTH DISTRIBUTION
24a
RATIO
1.0
0.8
0.6
0.4
0.2
0.0
50
100
150
200
250
300
PSEUDOPODIUM LENGTH
INDEX VALUE : 25 %
24b MODIFIED EMBODIMENT
100
300
COMPUTER
230
DISPLAY
PROCESSOR
210
STORAGE
220
240
INPUT
PROGRAM
21
IMAGE DATA
22
CELL IMAGE
30
SUPER-IMPOSED CELL IMAGE
80
120
IMAGING APPARATUS
LEARNED MODEL
23
AGING INDEX INFORMATION
24
PSEUDOPODIUM LENGTH DISTRIBUTION
24a
INDEX VALUE
24b

CELL IMAGE ANALYSIS SYSTEM, CELL IMAGE ANALYSIS APPARATUS AND CELL IMAGE ANALYSIS METHOD

CROSS REFERENCE TO RELATED APPLICATIONS

This application is a National Stage of International Application No. PCT/JP2022/031535 filed Aug. 22, 2022, claiming priority based on Japanese Patent Application No. 2021-140369 filed Aug. 30, 2021.

TECHNICAL FIELD

The present invention relates to a cell image analysis system, a cell image analysis apparatus, and a cell image analysis method, in particular, to a cell image analysis system, a cell image analysis apparatus, and a cell image analysis method for analyzing a degree of cell aging.

BACKGROUND ART

Techniques for analyzing a degree of cell aging are disclosed in the art. Such a technique is disclosed in Japanese Patent Publication No. JP 6694240, for example.

Japanese Patent Publication No. JP 6694240 discloses a technology for analyzing a degree of cell aging based on miRNA (microRNA) contained in cultivation solution for cultivating cells. Specifically, in Japanese Patent Publication No. JP 6694240, miRNA is extracted from supernatant that is supernatant of cultivation solution, and a degree of aging of cells is analyzed based on an amount of miRNA that is associated with cell aging in the extracted miRNA.

PRIOR ART

Patent Document

Patent Document 1: Japanese Patent Publication No. JP 6694240

SUMMARY OF THE INVENTION

Problems to be Solved by the Invention

However, in a configuration disclosed in Japanese Patent Publication No. JP 6694240, complicated processing is required to extract miRNA contained in the supernatant of the cultivation solution for cultivating cells. In addition, a process of extracting miRNA from the supernatant of the cultivation solution takes long time. Accordingly, there are problems that the analysis of a degree of cell aging is complicated, and that time required for analysis increases.

The present invention is intended to solve the above problem, and one object of the present invention is to provide a cell image analysis system, a cell image analysis apparatus, and a cell image analysis method capable of easily and speedily analyzing a degree of cell aging.

Means for Solving the Problems

In order to attain the aforementioned object, a cell image analysis system according to a first aspect of the present invention includes a cell image acquirer configured to acquire a cell image including a cell(s); a cell area acquirer configured to acquire a cell area(s) from the cell image; a pseudopodium area acquirer configured to acquire an area(s) of a pseudopodium/pseudopodia that is/are an elongated area(s) in the cell area(s) of the cell image; and an aging index information acquirer configured to acquire aging index information that indicates a degree(s) of aging of the cell(s) based a length(s) of the pseudopodium/pseudopodia.

A cell image analysis apparatus according to a second aspect of the present invention includes a cell image acquirer configured to acquire a cell image including a cell(s); a cell area acquirer configured to acquire a cell area(s) from the cell image; a pseudopodium area acquirer configured to acquire an area(s) of a pseudopodium/pseudopodia that is/are an elongated area(s) in the cell area(s) of the cell image; and an aging index information acquirer configured to acquire aging index information that indicates a degree(s) of aging of the cell(s) based a length(s) of the pseudopodium/pseudopodia.

A cell image analysis method according to a third aspect of the present invention includes a step of acquiring a cell image including a cell(s); a step of acquiring a cell area(s) from the cell image; a step of acquiring an area(s) of a pseudopodium/pseudopodia in the cell area(s); and a step of acquiring aging index information that indicates a degree(s) of aging of the cell(s) based a length(s) of the pseudopodium/pseudopodia.

In the cell image analysis apparatus according to the first aspect, the cell image analysis apparatus according to the second aspect, and the cell image analysis method according to the third aspect, dissimilar to a configuration that analyzes a degree of cell aging based on types and amounts of miRNA (microRNA) contained in supernatant of cultivation solution for cultivating cells, a degree of cell aging can be acquired based on the cell image without extracting miRNA from the supernatant by acquiring aging index information that indicates a degree(s) of aging of the cell(s) based a length(s) of a pseudopodium/pseudopodia included in the cell image. Consequently, it is possible to easily and speedily analyze a degree of cell aging by acquiring the cell image.

BRIEF DESCRIPTION OF THE DRAWINGS

FIG. 7 is a diagram illustrating details of processes of excluding pseudopodia separated from main bodies of cells.

FIG. 9 is a diagram illustrating details of processes of acquiring aging index information.

FIG. 11 is a diagram illustrating details of processes of acquiring a superimposed cell image.

MODES FOR CARRYING OUT THE INVENTION

Embodiments embodying the present invention will be described with reference to the drawings.

The following description describes a configuration of a cell image analysis system 200 including a cell image analysis apparatus 100, and a cell image analysis method according to an embodiment with reference to FIGS. 1 to 12.

(Image Processing System)

Figure 1:
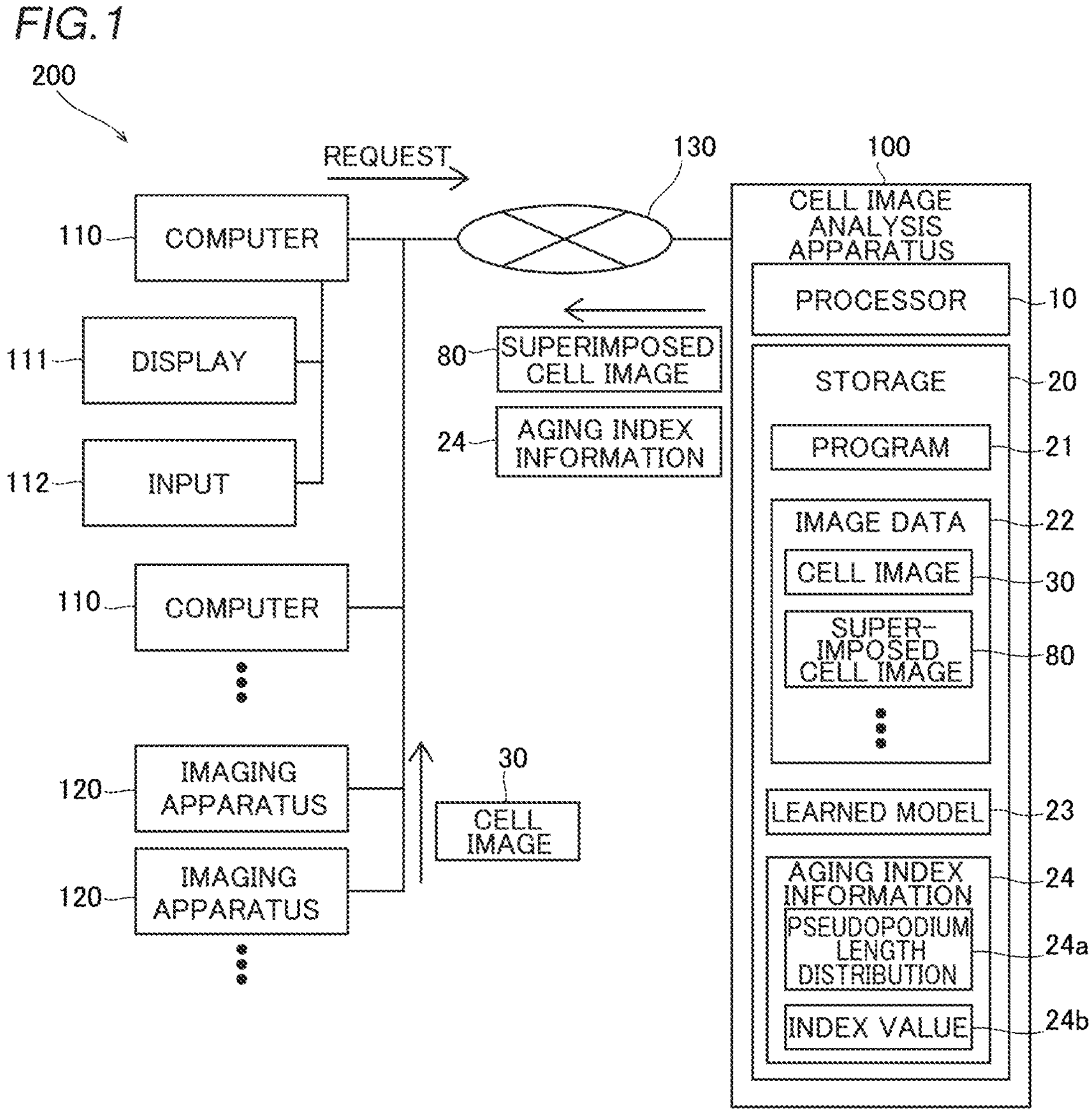
FIG. 1 is a block diagram showing an image processing system including an image processing apparatus according to an embodiment.

The cell image analysis system 200 shown in FIG. 1 is a single system that allows users who cultivate cells, etc. integrally to capture cell images 30, to apply analysis processing to the cell images 30, and to peruse images to which the analysis processing is applied.

(Outline of Image Processing System)

The cell image analysis system 200 includes a cell image analysis apparatus 100, a computer 110, and an imaging apparatus 120.

The cell image analysis system 200 shown in FIG. 1 is illustratively constructed of a client-server model. The computer 110 serves as a client terminal in the cell image analysis system 200. The cell image analysis apparatus 100 serves as a server in the cell image analysis system 200. The cell image analysis apparatus 100, the computer 110, and the imaging apparatus 120 are connected through a network 130, and can communicate with each other through the network. The cell image analysis apparatus 100 performs various types of information processing in response to requests (processing requests) from the computer 110 operated by users. The cell image analysis apparatus 100 is configured to apply analysis processing to the cell images 30 in response to request and to transmit images to which the analysis processing is applied to the computer 110. A graphical user interface (GUI) is displayed on a display 111 of the computer 110, and is configured to accept instructions provided to the cell image analysis apparatus 100 and to display analysis results analyzed by the cell image analysis apparatus 100 and images after the analysis.

The network 130 connects the cell image analysis apparatus 100, the computer 110, and the imaging apparatus 120 to each other so that they can communicate with each other. The network 130 can be a local area network (LAN) configured in the facility, for example.

The network 130 can be the Internet, for example. In a case in which the network 130 is the Internet, the cell image analysis system 200 can be a system configured in a cloud computing form.

The computer 110 is a so-called personal computer, equipped with a processor and storage. The display 111 and an input 112 are connected to the computer 110. For example, the display 111 is a liquid crystal display. The display 111 may be an electro-luminescence display, a projector or a head-mounted display. For example, the input 112 is an input device including a computer mouse and a key-board. The input 112 may be a touch panel. The cell image analysis system 200 can includes one or more computers 110. In this embodiment, the display 111 is configured to display aging index information 24, which will be described later.

Figure 2:
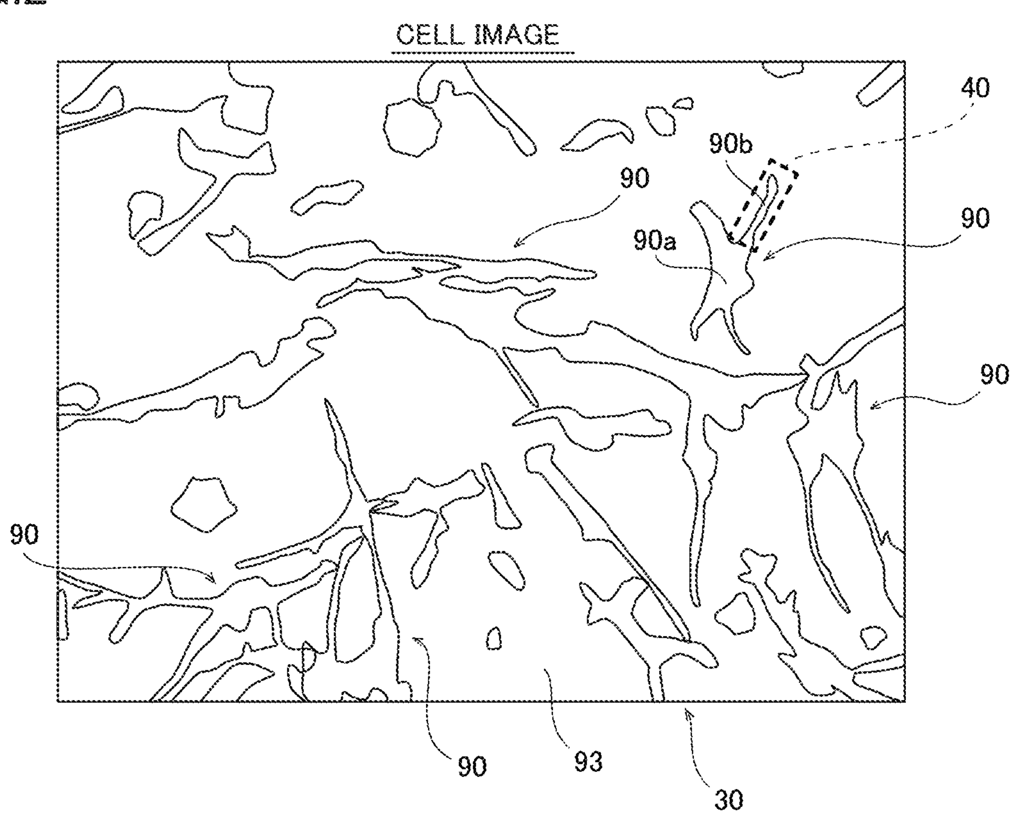
FIG. 2 is a view showing an exemplary cell image.

The Imaging apparatus 120 is configured to generate the cell images 30 including cells 90 (see FIG. 2). The imaging apparatus 120 can send the generated cell images 30 to the computer 110 and/or the cell image analysis apparatus 100 through the network 130. The imaging apparatus 120 is configured to capture microscopic images of the cells 90. The imaging apparatus 120 can use imaging methods such as bright-field observation, dark-field observation, phase contrast observation, and differential interference observation, etc. for imaging. One or more of the imaging apparatuses 120 are used in accordance with imaging methods. The cell image analysis system 200 can include one or more imaging apparatuses 120.

The cell image analysis apparatus 100 includes a processor 10, such as CPU (Central Processing Unit), FPGA (Field-Programmable Gate Array), and ASIC (Application Specific Integrated Circuit). The cell image analysis apparatus 100 is configured to perform arithmetic processing by using the processor 10 by executing a predetermined program 21.

The cell image analysis apparatus 100 includes a storage 20. The storage 20 includes a non-volatile storage device. For example, the non-volatile storage device is a hard disk drives, solid state drives, etc. The storage 20 is configured to store various programs 21 to be executed by the processor 10. The storage 20 is configured to store image data 22. The image data 22 includes the cell images 30 captured by the Imaging apparatus 120, and various images generated by applying image processing to the cell images 30 (superimposed cell images 80). The storage 20 stores a learned model 23 that has learned to acquire cell areas 91 (see FIG. 5) from the cell images 30. Also, the storage 20 stores the aging index information 24 acquired by analyzing the cell images 30. The aging index information 24 indicates degrees of aging of the cells 90. Specifically, the aging index information 24 includes a distribution **24*a* of lengths of the pseudopodia 90*b* (see FIG. 2), which will be described later, and an index value 24*b*. Among functions of analysis and image processing functions that can be performed by the cell image analysis apparatus 100, a configuration that acquires the aging index information 24 and processes of generating a superimposed cell image 80 from cell images 30** are described.

The cell image analysis apparatus 100 apply analysis processing and image processing to the cell image 30 in response to a request from the computer 110. As a result of the analysis processing, the cell image analysis apparatus 100 acquires the aging index information 24. In addition, as a result of image processing, the cell image analysis apparatus 100 generates the superimposed cell image 80. The cell image analysis apparatus 100 transmits the aging index information 24 acquired and the superimposed cell image 80 generated to the computer 110. The computer 110 displays the aging index information 24 and the superimposed cell image 80 on the display 111 when receiving the information.

<Cell Image>

As shown in FIG. 2, the cell image 30 is a microscopic image of cultivated cells 90 cultivated by using cell cultivation tools, for example. For example, the cells 90 included in the cell image 30 are adherent cells (non-colonialized cells), such as mesenchymal stem cells, fibroblasts, vascular endothelial cells, squamous cell carcinoma cells and endometrial cells.

The cell image 30 includes images of cells 90 (cell images), and a background 93. The cell 90 in the cell image 30 shown in FIG. 2 includes a main body **90*a* of the cell 90, and a subcellular structure. The exemplary subcellular structure shown in FIG. 2 is a pseudopodium 90*b* that is a protrusion of cytoplasm from the main body 90*a* of the cell 90, more specifically a filipodia that protrudes in a thread shape (filament-shape) from the main body 90*a*** of the cell

90. As the exemplary subcellular structure shown in FIG. 2, one of pseudopodia 90*b* is indicated by a rectangular box 40. The rectangular box 40 is merely shown for ease of illustrating the pseudopodium 90*b*.

It is known that a length of the pseudopodium 90*b* increases as the cell 90 is becoming closer to an aged state. The aged state of the cell 90 refers to a state in which its cell cycle stably stops. The term the cell is becoming closer to an aged state refers to that the cell is becoming closer to the state in which its cell cycle stably stop. The cell image analysis apparatus 100 according to this embodiment acquires the index information 24 that indicates degrees of aging of the cells 90 based pseudopodia 90*b* of the cells 90 included in the cell image 30. The cell image analysis apparatus 100 according to this embodiment can generate the superimposed cell image 80, which allows operators to realize the pseudopodia 90*b* at a glance. The following description describes the cell image analysis apparatus 100 in detail. The degree of aging of the cell 90 refers to how much the cell 90 is close to the state in which its cell cycle stably stop. In other words, the degree of aging of the cell 90 is a degree of progression of aging of the cell.

(Detailed Configuration of Cell Image Analysis Apparatus)

Figure 3:
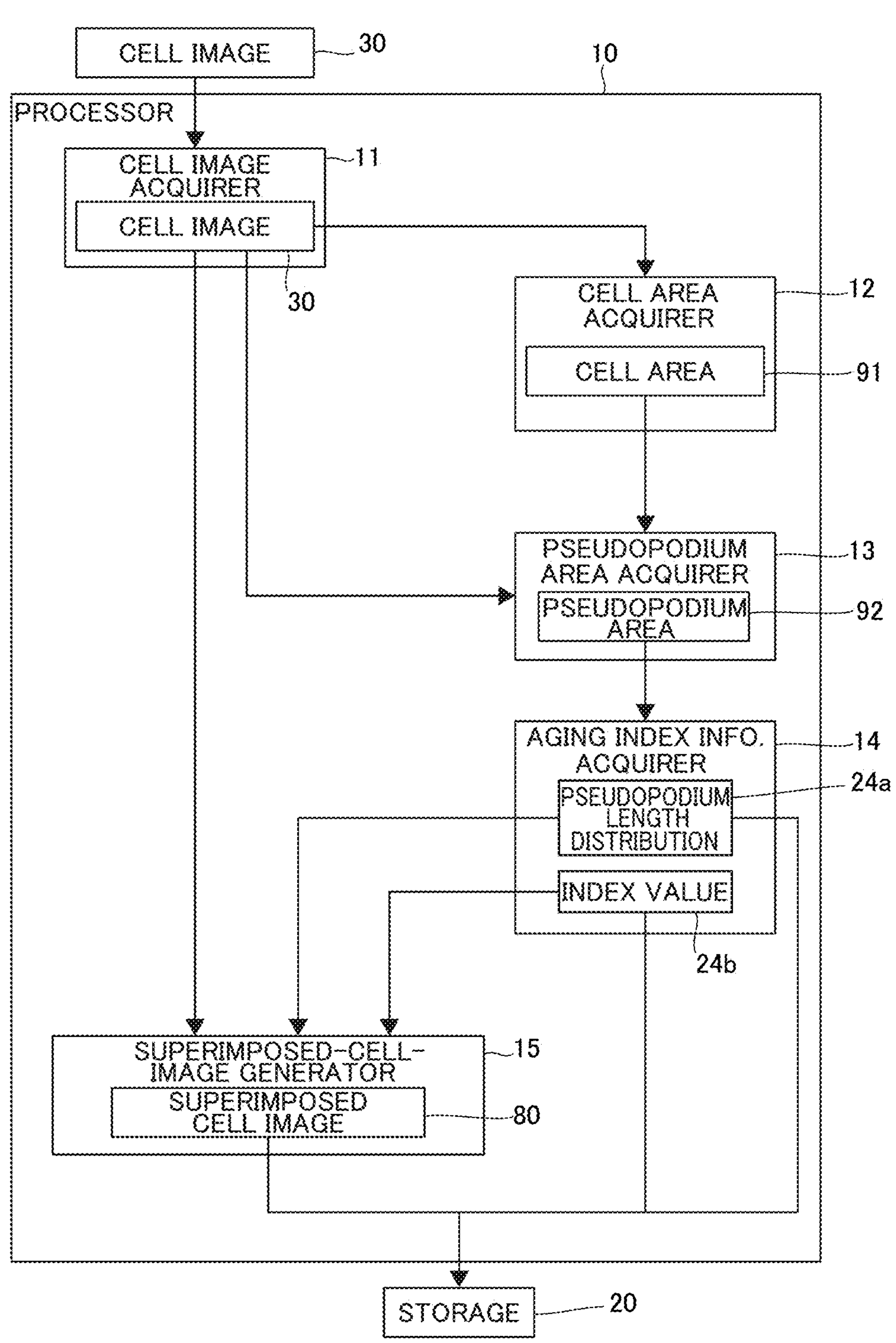
FIG. 3 is a functional block diagram functions of processors of the image processing apparatus.

FIG. 3 is a block diagram showing a configuration part that acquires the aging index information 24 (distribution 24*a* of lengths of pseudopodia 90*b* and index value 24*b*), a configuration part that generates the superimposed cell image 80, and other configuration parts in the cell image analysis apparatus 100.

The processor 10 of the cell image analysis apparatus 100 includes a cell image acquirer 11, a cell area acquirer 12, a pseudopodium area acquirer 13, an aging index information acquirer 14, and a superimposed-cell-image generator 15 as functional blocks. In other words, the processor 10 is configured to execute the program 21 stored in the storage 20 to serve as a cell image acquirer 11, the cell area acquirer 12, the pseudopodium area acquirer 13, the aging index information acquirer 14, and the superimposed-cell-image generator 15.

The cell image acquirer 11 has a function of acquiring the cell image 30 including the cells 90. The cell image acquirer 11 is configured to read a cell image 30 stored in the storage 20 (see FIG. 1) and to acquire the cell image 30 to which the binarization is applied. The cell image acquirer 11 may acquire a cell image 30 sent from the imaging apparatus 120 or the computer 110 through the network 130 (see FIG. 1). In addition, the cell image acquirer 11 is configured to output the cell image 30 acquired to the cell area acquirer 12, the pseudopodium area acquirer 13, and the superimposed-cell-image generator 15.

The cell area acquirer 12 acquires the cell areas 91 from the cell image 30. Specifically, the cell area acquirer 12 is configured to acquire the cell areas 91 (see FIG. 5) based on a learned model 23 (see FIG. 1) having learned to acquire cell areas 91 by extracting areas of cytoskeletons from teacher images including cells 90, and the cell image 30. The acquisition of the cell area 91 refers to that the cell area acquirer 12 specifies pixels (coordinates of pixels) that correspond to each cell area 91 in the cell image 30.

The learned model 23 is produced by training the learned model by using images that include cells 90 as input data and images that include labeled areas of cytoskeletons as output data. The images that include labeled areas of cytoskeletons are images of cytoskeletons of cells 90 stained by actin, or images of cytoskeletons of cells 90 in the cell image 30 to which labels are attached by operators, for example.

The pseudopodium area acquirer 13 acquires areas 92 (see FIG. 6) of the pseudopodia 90*b* (see FIG. 2) that are an elongated areas of the cell areas 91 in the cell image 30. In this embodiment, the pseudopodium area acquirer 13 acquires the areas 92 of the pseudopodia 90*b* based on the cell image 30, and a pseudopodium removal image 32 in which the pseudopodia 90*b* are removed from the cell image 30. In this embodiment, the pseudopodium area acquirer 13 acquires a pseudopodium area image 36 (see FIG. 8) as the areas 92 of the pseudopodia 90*b*. the pseudopodium area acquirer 13 outputs the areas 92 of the pseudopodia 90*b* acquired (pseudopodium area image 36) to the aging index information acquirer 14.

The aging index information acquirer 14 acquires the aging index information 24 (see FIG. 1) that indicates degrees of aging of cells 90 based on the lengths of the pseudopodia 90*b*. Specifically, the aging index information acquirer 14 is configured to acquire, as the aging index information 24, at least one of distribution 24*a* of lengths of the pseudopodia 90*b*, and an index value 24*b* that indicates a ratio of the pseudopodia 90*b* whose length is not smaller than a predetermined length to the pseudopodia 90*b* acquired. In this embodiment, the aging index information acquirer 14 acquires both the distribution 24*a* of the lengths of the pseudopodia 90*b*, and the index value 24*b*. The aging index information 24 (distribution 24*a* of lengths of the pseudopodia 90*b*, and index value 24*b*) acquired by the aging index information acquirer 14 is output to the storage 20. As a result, the aging index information 24 (distribution 24*a* of lengths of the pseudopodia 90*b*, and index value 24*b*) is stored in the storage 20. In this embodiment, the aging index information acquirer 14 outputs the aging index information 24 (distribution 24*a* of the lengths of the pseudopodia 90*b*, and index value 24*b*) to the superimposed-cell-image generator 15.

The superimposed-cell-image generator 15 generates the superimposed cell image 80 from the cell image 30. In the superimposed cell image 80, the cell areas 91 (see FIG. 5) and the areas 92 (see FIG. 6) of the pseudopodia 90*b* (see FIG. 2) are superimposed on the cell image 30, and the indices 70 (see FIG. 11) indicating lengths of the pseudopodia 90*b* are superimposed on the areas 92 of the pseudopodium 90*b*. The superimposed cell image 80 generated by the superimposed-cell-image generator 15 is output to the storage 20. As a result, the superimposed cell image 80 is stored in the storage 20.

The aging index information 24 and the superimposed cell image 80 are transmitted to the computer 110 in response to request, and is displayed on the display 111.

(Cell Image Analysis Method)

The cell image analysis method according to this embodiment is now described. The cell image analysis method according to this embodiment is a cell image analysis method for analyzing degrees of aging of cells 90 in the cell image 30. The cell image analysis method can be executed by the cell image analysis apparatus 100 (processor 10).

The cell image analysis method of this embodiment includes at least the following steps.

(1) Step of acquiring a cell image 30 including cells 90.
(2) Step of acquiring cell areas 91 from the cell image 30.
(3) Step of acquiring areas 92 of pseudopodia 90*b* in the cell areas 91.
(4) Step of acquiring aging index information 24 that indicates degrees of aging of the cells 90 based lengths of pseudopodia 90*b*.

The step (1) of acquiring the cell image 30 is executed by the cell image acquirer 11. The step (2) of acquiring the cell areas 91 is executed by the cell area acquirer 12. The step (3) of acquiring the areas 92 of the pseudopodia 90*b* is executed by the pseudopodium area acquirer 13. Step (4) of acquiring the aging index information 24 is executed by the aging index information acquirer 14. The cell image analysis method according to this embodiment further includes processes of excluding pseudopodia 90*b* separated from main bodies 90*a* of cells 90 by using the pseudopodium area acquirer 13, processes of excluding pseudopodia 90*b* that are in contact with edges of the cell image 30 by using the pseudopodium area acquirer 13, and processes of generating the superimposed cell image 80 by using the superimposed-cell-image generator 15.

A processing flow executed by the cell image analysis apparatus 100 is now described in detail with reference to FIGS. 4 to 12.

<Image Acquisition>

In step S1, the cell image acquirer 11 (see FIG. 3) acquires a cell image 30 from the storage 20, the imaging apparatus 120 or the computer 110. The processing in step S1 is the aforementioned processes in the step (1).

<Acquisition of Cell Areas>

In step S2, the cell area acquirer 12 (see FIG. 3) executes processes of acquiring the cell areas 91 (see FIG. 5) from the cell image 30 acquired in step S1 (see the aforementioned step (2)). The processes of acquiring the cell areas 91 are described in detail with reference to FIG. 5.

In step S2*a*, the cell area acquirer 12 inputs the cell image 30 into the learned model 23. The learned model 23, receives the cell image 30 input, outputs probability values of pixels of the cell image 30 each of which indicates that each pixel belongs to the cell area 91. The learned model 23 outputs one probability value per pixel.

In step S2*b*, the cell area acquirer 12 acquires the cell areas 91. Specifically, the cell area acquirer 12 acquires the cell area image 31 based on the probability values, which are output from the learned model 23 and indicate that the pixels belong to the cell areas 91. In this embodiment, the cell area acquirer 12 acquires distribution of probability values indicating that the pixels belong to the cell areas 91 as the cell area image 31. Pixels other than the cell areas 91 in the cell area image 31 are defined as a background 93.

In step S2*c*, the cell area acquirer 12 stores the cell area 91 in the storage 20. Specifically, the cell area acquirer 12 stores the cell area 91 by storing the acquired cell area image 31 in the storage 20.

The cell area image 31 is an image that shows the cell areas 91 and the background 93 discriminatively from each other. Specifically, the cell areas 91 are colored in the cell area image 31. In this embodiment, the cell areas 91 are colored in blue in the cell area image 31, for example. The cell areas 91 are shown illustratively discriminatively from the background 93 by hatching the cell areas 91 for ease of illustration in FIG. 5.

<Acquisition of Pseudopodium Areas>

Figure 4:
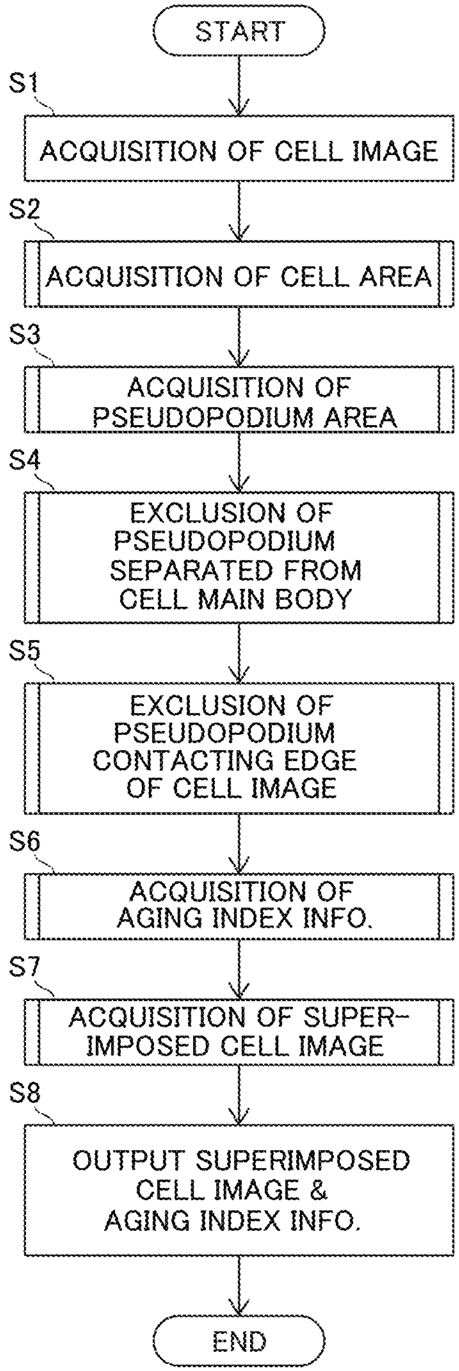
FIG. 4 is a flowchart illustrating processes of a cell image analyzer according to this embodiment.
Figure 5:
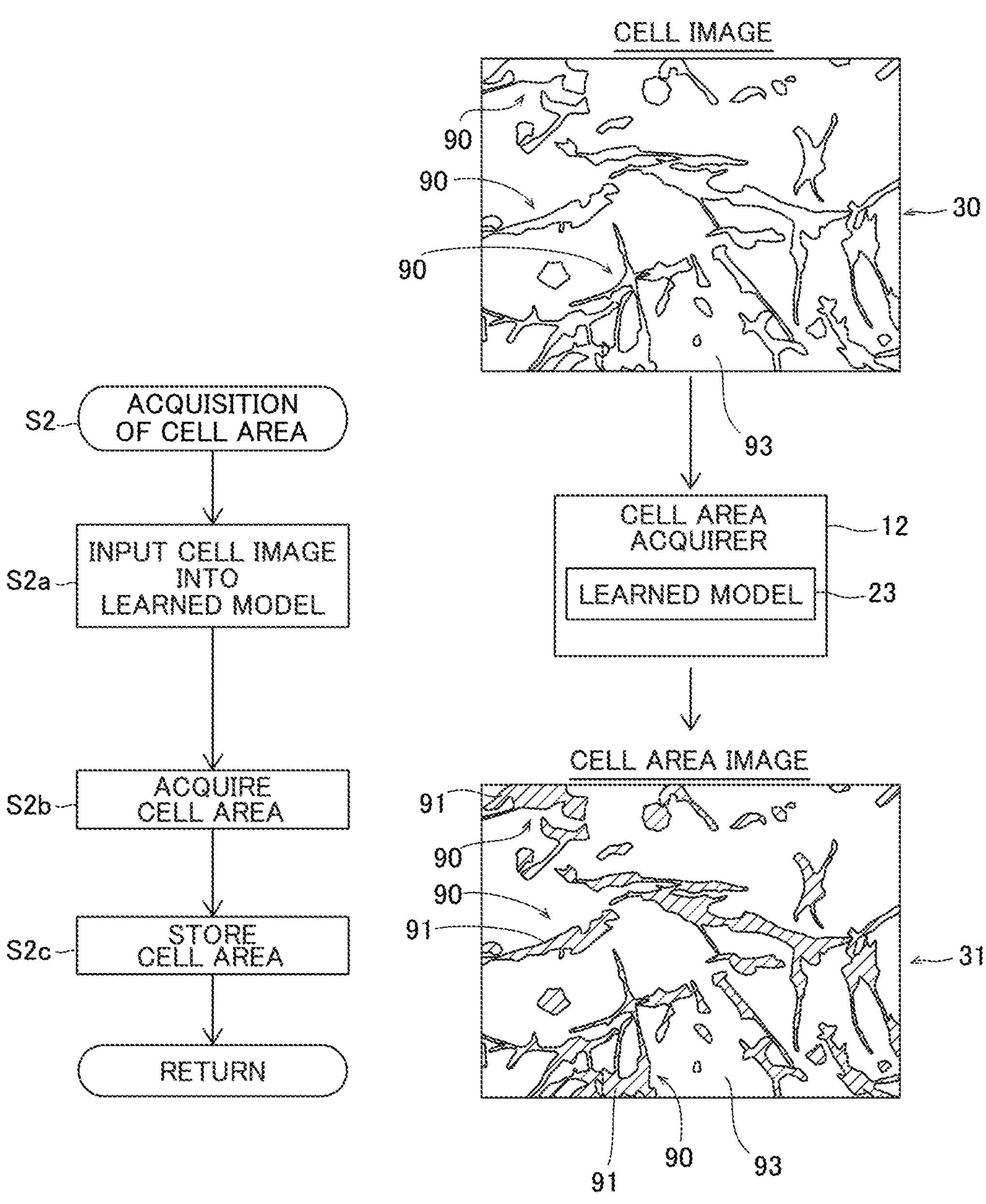
FIG. 5 is a diagram illustrating details of processes of acquiring cell areas.
Figure 6:
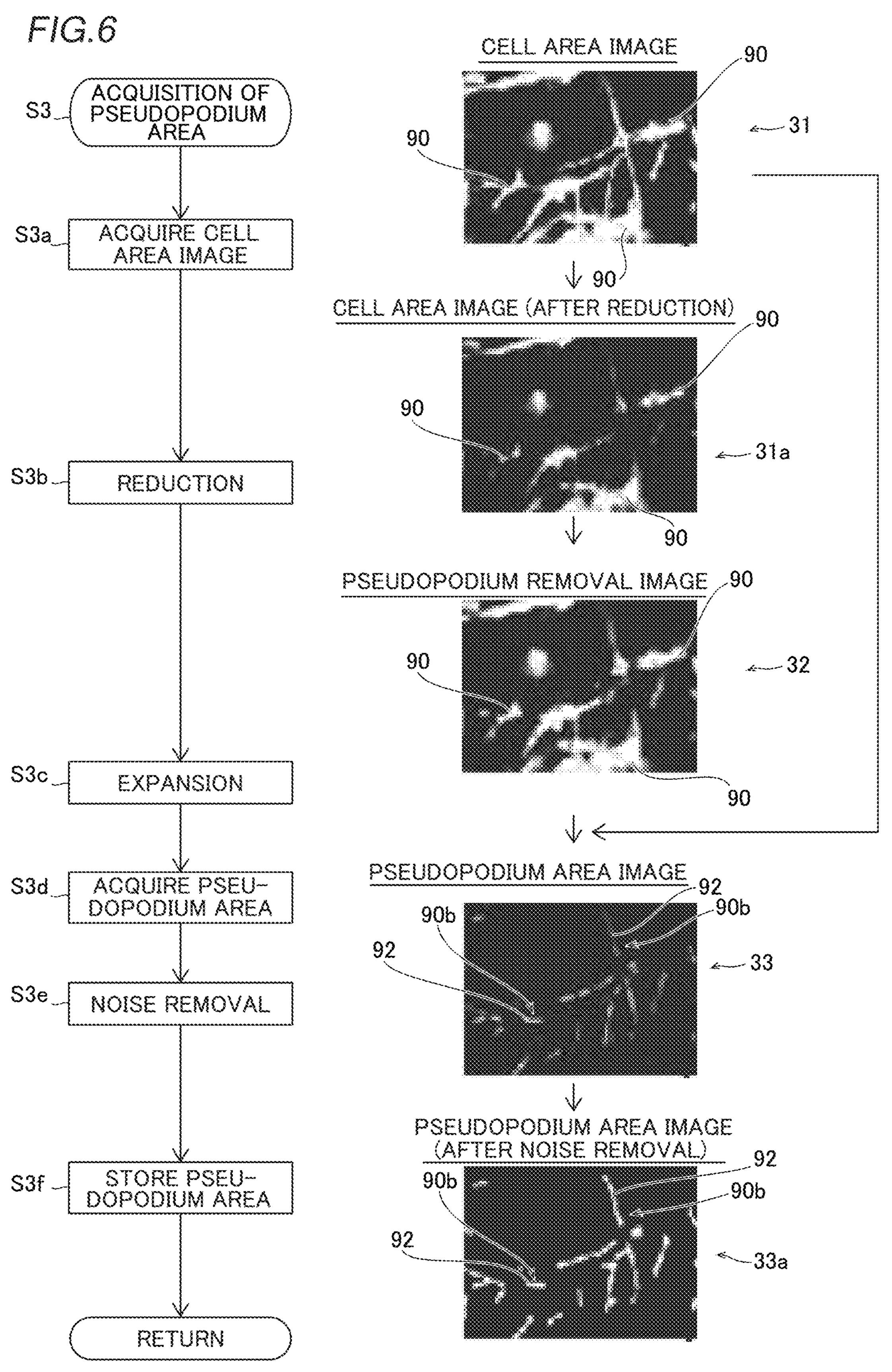
FIG. 6 is a diagram illustrating details of processes of acquiring pseudopodium areas.
Figure 8:
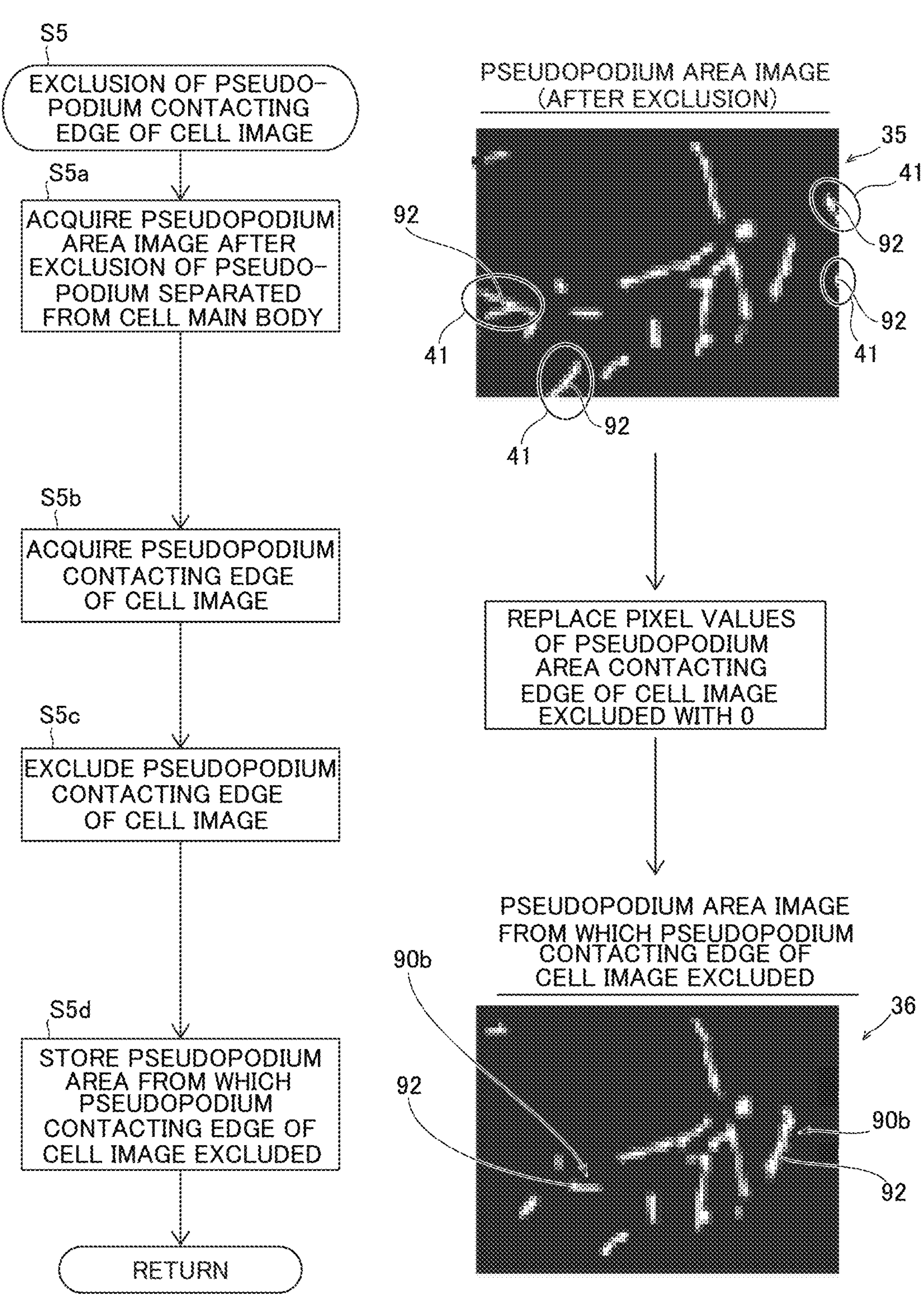
FIG. 8 is a diagram illustrating details of processes of excluding pseudopodia that are in contact with edges of a cell image.

In step S3 of FIG. 4, the pseudopodium area acquirer 13 executes processes of acquiring the areas 92 of the pseudopodium 90*b* from the cell areas 91 acquired by the cell area acquirer 12 (the aforementioned step (3)). The processes of acquiring the areas 92 of the pseudopodia 90*b* are described in detail with reference to FIG. 6.

Step S3 of acquiring the areas 92 of pseudopodia 90*b* includes step S3*a* of acquiring the cell area image 31, step S3*b* of reducing the cell area image 31, step S3*c* of expanding a reduced cell area image 31*a*, step S3*d* of acquiring the areas 92 of pseudopodia 90*b* based on the cell area image 31 and the pseudopodium removal image 32, step S3*e* of removing noises from the pseudopodium area image 33, and step S3*f* of storing the pseudopodium area image 33 subjected to the noise removal.

In step S3*a*, the pseudopodium area acquirer 13 acquires the cell area image 31. In this embodiment, the pseudopodium area acquirer 13 acquires the cell area image 31 from the storage 20.

In step S3*b*, the pseudopodium area acquirer 13 applies reduction processes to the cell area image 31. The reduction refers to processing in which a center of kernel whose size is set to a predetermined kernel size is specified to a target pixel, and a pixel value of the target pixel is replaced with the smallest pixel value in pixel values of pixels that are included in the kernel.

In this embodiment, the pseudopodium area acquirer 13 acquires the reduced cell area image 31*a* by executing a predetermined number of the reduction processes.

In the reduced cell area image 31*a*, edges of the cell 90 will become equal to a pixel value of the background 93 by replacing pixel values of the reduced cell area image with the pixel value of the background 93 by in the reduction processing. As a result, the pseudopodia 90*b* will disappear after the reduction processes. While the pseudopodia 90*b* disappear, areas other than the pseudopodia 90*b* (main bodies 90*a* of cells 90) are also reduced. For this reason, the cell areas 91 in the reduced cell area image 31*a* become smaller than the cell areas 91 in the cell area image 31 before the reduction processing. The kernel size is set in accordance with a size of the pseudopodium 90*b* to be removed from the cell area image 31. In this embodiment, the kernel size is, for example, 3×3 px (pixels). The number of reduction processes is also set in accordance with the size of the pseudopodium 90*b* to be removed from the cell area image 31. That is, the kernel size and the number of reduction processes are set in accordance with sizes of the cells 90 included in the cell image 30. In this embodiment, the pseudopodium area acquirer 13 executes four reduction processes, for example. The sizes of the cells 90 included in the cell image 30 varies depending on a magnification when the cell image 30 is captured. For this reason, the kernel size and the number of reduction processes are set for each cell image 30 in accordance with the sizes of the cells 90 included in the cell image 30 and the magnification when the cell image 30 is captured.

In step S3*c*, the pseudopodium area acquirer 13 acquires the pseudopodium removal image 32 by expanding the reduced cell area image 31*a*. The pseudopodium removal image 32 includes the cell areas 91 from which the areas 92 of the pseudopodia 90*b* are removed. Accordingly, the pseudopodium area acquirer 13 can specify pixels of the cell areas 91 that correspond to the cell areas 91 from which the areas 92 of the pseudopodia 90*b* are removed in the cell area image 31. That is, in this embodiment, the pseudopodium area acquirer 13 acquires the pseudopodium removal image 32 by reducing and expanding the cell image 30 (cell area image 31). The pseudopodium removal image 32 shows the removal of the pseudopodium 90*b* from the cell area 91.

The expansion processing is processing opposite to the reduction processing. In other words, the expansion processing refers to processing in which a pixel value of the target pixel is replaced with the largest pixel value in pixel values of pixels that are included in the kernel. The cell area 91 is increased every when the expansion process is executed. In this embodiment, the pseudopodium area acquirer 13 executes the expansion processes the number of which is equal to the number of the reduction processes executed. In this embodiment, the pseudopodium area acquirer 13 is executes four expansion processes, for example. As a result, the cell areas 91 included in the pseudopodium removal image 32 return to the original sizes of the cell areas 91 included in the cell area image 31. Although shapes of the main bodies 90*a* of the cells 90 return to their original shapes by the expansion processing, the pseudopodia 90*b* that have disappeared by the reduction processing do not return. As a result, the pseudopodium removal image 32 in which the areas 92 of the pseudopodia 90*b* are removed can be acquired by executing the reduction processing and the expansion processing.

In step S3*d*, the pseudopodium area acquirer 13 acquires the areas 92 of the pseudopodia 90*b*. In this embodiment, the pseudopodium area acquirer 13 is configured to acquire the areas 92 of the pseudopodia 90*b* based on difference between the cell image 30 and the pseudopodium removal image 32. Specifically, the pseudopodium area acquirer 13 acquires the pseudopodium area image 33 including the areas 92 of the pseudopodia 90*b* by subtracting the pseudopodium removal image 32 from the cell area 91 (cell area image 31) acquired from the cell image 30. Specifically, in the pseudopodium area acquirer 13 acquires the pseudopodium area image 33 in which only the areas 92 of the pseudopodia 90*b* is included by subtracting from pixel values of pixels in the cell area image 31, pixel value of their corresponding pixel in the pseudopodium removal image 32.

In step S3*e*, the pseudopodium area acquirer 13 removes noises from the pseudopodium area image 33. The noise removal processing includes a binarization process, a removal process of small cell areas, and a closing process.

Because areas that have a pixel value not smaller than a threshold value can be extracted as the areas 92 of the pseudopodia 90*b* by executing the binarization process, it is possible to prevent that some of the areas 92 of the pseudopodia 90*b* cannot be extracted.

The removal process of small cell areas is a process of removing the cell areas 91 that have an area not larger than a predetermined size. The pseudopodium area acquirer 13 removes the areas 92 of the pseudopodia 90*b* that have an area not larger than 10 px (pixel)×10 px (100 px$^2$), for example. As a result, because noises included in the candidate areas 92 of the pseudopodia 90*b* extracted by the binarization process can be removed, it is possible to prevent that the noises are extracted as the areas 92 of the pseudopodia 90*b*.

The closing processing is a process of expanding white areas in the image and then reducing the white areas. The closing processing can connect disconnected lines separated by a short distance and can fill holes (black areas) that locally exist in the cell image without changing sizes of the cell images (white areas).

In step S3*f*, the pseudopodium area acquirer 13 stores the areas 92 of the pseudopodia 90*b* after the noise removal in the storage 20. Specifically, the pseudopodium area acquirer 13 stores the pseudopodium area image 33*a* acquired after noise reduction.

Although images are shown in different sizes in FIGS. 5 to 9, 11, and 12 for ease of illustration, the actual image size is not changed in this embodiment.

<Exclusion of Pseudopodia Separated from Main Bodies of Cells>

In step S4 of FIG. 4, the pseudopodium area acquirer 13 (see FIG. 3) excludes, in the areas 92 (see FIG. 2) of the pseudopodia 90*b* (see FIG. 2), the areas 92 of the pseudopodia 90*b* separated from the main bodies 90*a* (see FIG. 2) of the cells 90 (see FIG. 2) from subjects to be acquired for the aging index information 24. processes of excluding the areas 92 of the pseudopodia 90*b* separated from the main bodies 90*a* of the cells 90 by using the pseudopodium area acquirer 13 is described in detail with reference to FIG. 7.

Step S4 of excluding the areas 92 of the pseudopodia 90*b* separated from the main bodies 90*a* of the cells 90 includes step S4*a* of acquiring the cell area image 31, step S4*b* of acquiring the pseudopodium area image 33*a* whose noises are removed, step S4*c* of acquiring the pseudopodia 90*b* separated from the main bodies 90*a* of the cells 90, step S4*d* of excluding the pseudopodia 90*b* separated from the main bodies 90*a* of the cells 90, and step S4*e* of storing the pseudopodium area image 35 in which the pseudopodia 90*b* separated from the main bodies 90*a* of the cells 90 are removed.

In step S4*a*, the pseudopodium area acquirer 13 acquires the cell areas 91. Specifically, the pseudopodium area acquirer 13 acquires the cell area image 31 from the storage 20.

In step S4*b*, the pseudopodium area acquirer 13 acquires the pseudopodium area image 33*a* from the storage 20. The pseudopodium area image 33*a* includes only the areas 92 of the pseudopodia 90*b* after noise removal. Accordingly, the pseudopodium area acquirer 13 can specify the areas 92 of the pseudopodia 90*b* after noise removal based on the pseudopodium area image 33*a*. Any one of the process in step S4*a* and the process in step S4*b* can be executed before another process.

In step S4*c*, the pseudopodium area acquirer 13 acquires the pseudopodia 90*b* separated from the main bodies 90*a* (see FIG. 2) of the cells 90. Specifically, the pseudopodium area acquirer 13 acquires the areas 92 of the pseudopodia 90*b* that have a size whose ratio of the area 92 of the pseudopodium 90*b* to the cell area 91 is not smaller than a predetermined ratio as the pseudopodia 90*b* separated from the main bodies 90*a* of the cells 90. In this embodiment, the pseudopodium area acquirer 13 acquires an area 91*a* of the cell area 91 and an area 92*a* and the area 92 of the pseudopodium 90*b* for each cell area 91 as shown in an image 34. The pseudopodium area acquirer 13 acquires a ratio of the area 91*a* of the cell area 91 to the area 92*a* of the area 92 of the pseudopodium 90*b*. Specifically, the pseudopodium area acquirer 13 specifies the pseudopodia 90*b* that have a ratio of the area 91*a* of the cell area 91 to the area 92*a* and the area 92 of the pseudopodium 90*b* as the pseudopodia 90*b* separated from the main bodies 90*a* of the cells 90. The image 34 is an image for illustrating a process of specifying the pseudopodia 90*b* that are separated from the main bodies 90*a* of the cells 90 by the pseudopodium area acquirer 13, and is not an image to be actually generated.

In step S4*d*, the pseudopodium area acquirer 13 excludes the areas 92 of the pseudopodia 90*b* separated from the main bodies 90*a* of the cells 90 from subjects to be acquired for the aging index information 24. In this embodiment, the pseudopodium area acquirer 13 acquires the pseudopodium area image 35 after exclusion processing is by removing the areas 92 of the pseudopodia 90*b* separated from the main bodies 90*a* of the cells 90 from the pseudopodium area image 33*a*. Specifically, the pseudopodium area acquirer 13 removes the areas 92 of the pseudopodia 90*b* separated from the main bodies 90*a* of the cells 90 from the pseudopodium area image 33*a* by replacing pixel values of the areas 92 of the pseudopodia 90*b* separated from the main bodies 90*a* of the cells 90 with 0 (zero).

In step S4*e*, the pseudopodium area acquirer 13 stores the areas 92 of the pseudopodia 90*b* after exclusion processing of pseudopodia 90*b* separated from the main bodies 90*a* of the cells 90 in the storage 20. Specifically, the pseudopodium area acquirer 13 stores the pseudopodium area image 35 in the storage 20.

<Exclusion of Pseudopodia in Contact with Edges of Cell Image>

In step S5 of FIG. 4, the pseudopodium area acquirer 13 excludes, in the areas 92 of the pseudopodia 90*b*, the pseudopodia 90*b* that are in contact with the edges of the cell image 30 from subjects to be acquired for the aging index information 24. The processes of excluding the pseudopodia 90*b* that are in contact with the edges of the cell image 30 are described in detail with reference to FIG. 8.

The step S5 of excluding the pseudopodia 90*b* that are in contact with the edges of the cell image 30 includes step S5*a* of acquiring the pseudopodium area image 35 in which the pseudopodia 90*b* separated from the main bodies 90*a* of the cells 90 are removed, step S5*b* of acquiring the pseudopodia 90*b* that are in contact with the edges of the cell image 30, step S5*c* of excluding the pseudopodia 90*b* that are in contact with the edges of the cell image 30, and step S5*d* of storing the pseudopodium area image 36 in which the pseudopodia 90*b* that are in contact with the edges of the cell image 30 are excluded.

In step S5*a*, the pseudopodium area acquirer 13 acquires the pseudopodium area image 35. Specifically, the pseudopodium area acquirer 13 reads the pseudopodium area image 35 stored in the storage 20.

In step S5*b*, the pseudopodium area acquirer 13 acquires the pseudopodia 90*b* that are in contact with the edges of the cell image 30. In this embodiment, the pseudopodium area acquirer 13 acquires the pseudopodia 90*b* that are in contact with the edges of the pseudopodium area image 35 in which the pseudopodia 90*b* that are separated from the main bodies 90*a* of the cells 90 are excluded. For example, the pseudopodium area acquirer 13 acquires pixels that have a pixel value of not 0 (zero) in outermost peripheral pixels of the pseudopodium area image 35. The pseudopodium area acquirer 13 specifies the areas 92 of the pseudopodia 90*b* that includes the outermost peripheral pixels that have a pixel value of not 0 (zero) as the pseudopodia 90*b* that are in contact with the edges of the cell image 30. Alternatively, the pseudopodium area acquirer 13 can have a known configuration for acquiring the pseudopodium 90*b* that are in contact with the edges of the cell image 30 other than the aforementioned configuration.

In this embodiment, the pseudopodium area acquirer 13 acquires, in the areas 92 of the pseudopodia 90*b* included in the pseudopodium area image 35, the areas 92 of the pseudopodia 90*b* that are encircled by oval lines 41 as the pseudopodia 90*b* that are in contact with the edges of the pseudopodium area image 35.

In step S5*c*, the pseudopodium area acquirer 13 excludes the pseudopodia 90*b* that are in contact with the edges of the cell image 30. Specifically, the pseudopodium area acquirer 13 excludes the pseudopodia 90*b* that are in contact with the pseudopodium area image 35 acquired in step S5*b* from the pseudopodium area image 35 so as to exclude the pseudopodia 90*b* that are in contact with the edges of the cell image 30. Specifically, the pseudopodium area acquirer 13 excludes the pseudopodia 90*b* that are in contact with the edges of the cell image 30 by replacing pixel values of the areas 92 of the pseudopodia 90*b* that are in contact with the edges of the cell image 30 with 0 (zero). In this embodiment, the pseudopodium area acquirer 13 acquires the pseudopodium area image 36 in which excluding the pseudopodia 90*b* that are in contact with the edges of the cell image 30 are excluded.

In step S5*d*, the pseudopodium area acquirer 13 stores the areas 92 of the pseudopodia 90*b* that do not include the pseudopodia 90*b* that are in contact with the edges of the cell image 30 and have been excluded. Specifically, the pseudopodium area acquirer 13 stores the areas 92 of the pseudopodia 90*b* that do not include the pseudopodia 90*b* that are in contact with the edges of the cell image 30 and have been excluded by storing the pseudopodium area image 36 in the storage 20.

<Acquisition of Aging Index Information>

In step S6 of FIG. 4, the aging index information acquirer 14 (see FIG. 3) acquires the aging index information 24 that indicates degrees of aging of the cells 90 based on the lengths of the pseudopodia 90*b* (the aforementioned step (4)). In this embodiment, the aging index information acquirer 14 acquires the aging index information 24 based on the pseudopodia 90*b* whose length is not smaller than a predetermined length. The processes of acquiring the aging index information 24 by using the aging index information acquirer 14 are described in detail with reference to FIG. 9.

Step S6 of acquiring the aging index information 24 includes step S6*a* of acquiring the pseudopodium area image 36 in which the pseudopodia 90*b* that are in contact with edges of the cell image 30 are excluded, step S6*b* of acquiring minimum bounding rectangles 71 of the pseudopodia 90*b* included in the pseudopodium area image 36, step S6*c* of acquiring longitudinal lengths of the areas of the pseudopodia 90*b*, step S6*d* of acquiring the aging index information 24, and step S6*e* of storing the aging index information 24.

In step S6*a*, the aging index information acquirer 14 acquires the areas 92 of the pseudopodia 90*b* that do not include the pseudopodia 90*b* that are in contact with the edges of the cell image 30 and have been excluded. Specifically, the aging index information acquirer 14 specifies the areas 92 of the pseudopodia 90*b* that do not include the pseudopodia 90*b* that are in contact with the edges of the cell image 30 and have been excluded based on the pseudopodium area image 36 read from the storage 20.

In step S6*b*, the pseudopodium area acquirer 13 acquires the minimum bounding rectangles 71 of the pseudopodia 90*b* included in the pseudopodium area image 35 as shown in an image 37. The minimum bounding rectangle 71 refers to a rectangle that has the smallest area among rectangles that circumscribe the pseudopodium 90*b*. In this embodiment, the pseudopodium area acquirer 13 acquires the minimum bounding rectangle 71 by using calculation processing. The technique for acquiring the minimum bounding rectangle 71 by using the pseudopodium area acquirer 13 is not limited to calculation processing. The image 37 is an image for illustrating a configuration of acquiring the minimum bounding rectangles 71, and is not an image to actually be generated.

In step S6*c*, the aging index information acquirer 14 acquires longitudinal lengths of the areas 92 of the pseudopodia 90*b* so as to acquire the lengths of the pseudopodia 90*b*. In this embodiment, the aging index information acquirer 14 is configured to acquire longitudinal lengths L of the minimum bounding rectangles 71 of the areas 92 of the pseudopodia 90*b* so as to acquire the lengths of the areas 92 of the pseudopodia 90*b*. In this embodiment, the aging index information acquirer 14 acquires longitudinal lengths L of the minimum bounding rectangles 71 for all the areas 92 of the pseudopodia 90*b* so that the area of each pseudopodium has its length defined by the longitudinal length of its corresponding minimum bounding rectangle. In this embodiment, the aging index information acquirer 14 calculates the length L of a long side of the minimum bounding rectangle 71 not in px (pixels) but in μ m by using information on a magnification of the cell image 30.

In step S6*d*, the aging index information acquirer 14 acquires the aging index information 24. In this embodiment, the aging index information acquirer 14 is configured to acquire, as the aging index information 24, at least one of distribution 24*a* (see FIG. 1) of lengths of the pseudopodia 90*b*, and an index value 24*b* that indicates a ratio of the pseudopodia 90*b* whose length is not smaller than a predetermined length to the pseudopodia 90*b* acquired.

Here, the area 92 of the pseudopodium 90*b* acquired by the pseudopodium area acquirer 13 can include not only the area 92 of the actual pseudopodium 90*b* but also an area other than the pseudopodium 90*b*, such as a thin part of the cell 90 that becomes thinner due to cell overlapping in some cases. If the aging index information 24 is acquired in such as case in which the area of the pseudopodium 90*b* includes an area other than the pseudopodium, accuracy of the aging index information 24 is reduced. To address this, in this embodiment, the aging index information acquirer 14 acquires the aging index information 24 based on the pseudopodia 90*b* whose length is not smaller than a predetermined length. The predetermined length is 40 μm, for example.

In this embodiment, the aging index information acquirer 14 acquires the index value 24*b* based on the following Equation.

Index Value=Number of Long Pseudopodia/(Number of Pseudopodia Having Length Not Smaller Than Predetermined Length)×100

Here, the Number of Long Pseudopodia is the number of the pseudopodia 90*b* whose length is not smaller than 100 μm. The Number of Pseudopodia Having Length Not Smaller Than Predetermined Length is the number of pseudopodia 90*b* whose length is not smaller than the predetermined length among the pseudopodia 90*b* included in the pseudopodium area image 36. That is, the Number of Pseudopodia Having Length Not Smaller Than Predetermined Length can be obtained by adding the number of pseudopodia 90*b* whose length is not smaller than 40 μm and smaller than 100 μm, to the number of pseudopodia 90*b* whose length is not smaller than 100 μm. Alternatively, the long pseudopodium 90*b* can be defined by a length other than 100 μm. The length that defines the long pseudopodium 90*b* is experimentally specified by performing an experiment that determines a criterion depending on a type of the cells 90 and environments in which the cells 90 are cultivated. In this embodiment, the pseudopodium 90*b* whose length is not smaller than 100 μm is illustratively defined as the cell 90 that is becoming closer to an aged state.

In this embodiment, the aging index information acquirer 14 acquires a ratio of the pseudopodia 90*b* whose length is not smaller than 100 μm to the pseudopodia 90*b* whose length is not smaller than 40 μm in the pseudopodia 90*b* that are included in the pseudopodium area image 36 as the index value 24*b*.

In step S6*e*, the aging index information acquirer 14 stores the distribution 24*a* of length of the pseudopodia 90*b*, and the index value 24*b* in the storage 20. Also, the aging index information acquirer 14 stores the image 37 on which the minimum bounding rectangles 71 are superimposed in the storage 20.

Figure 10:
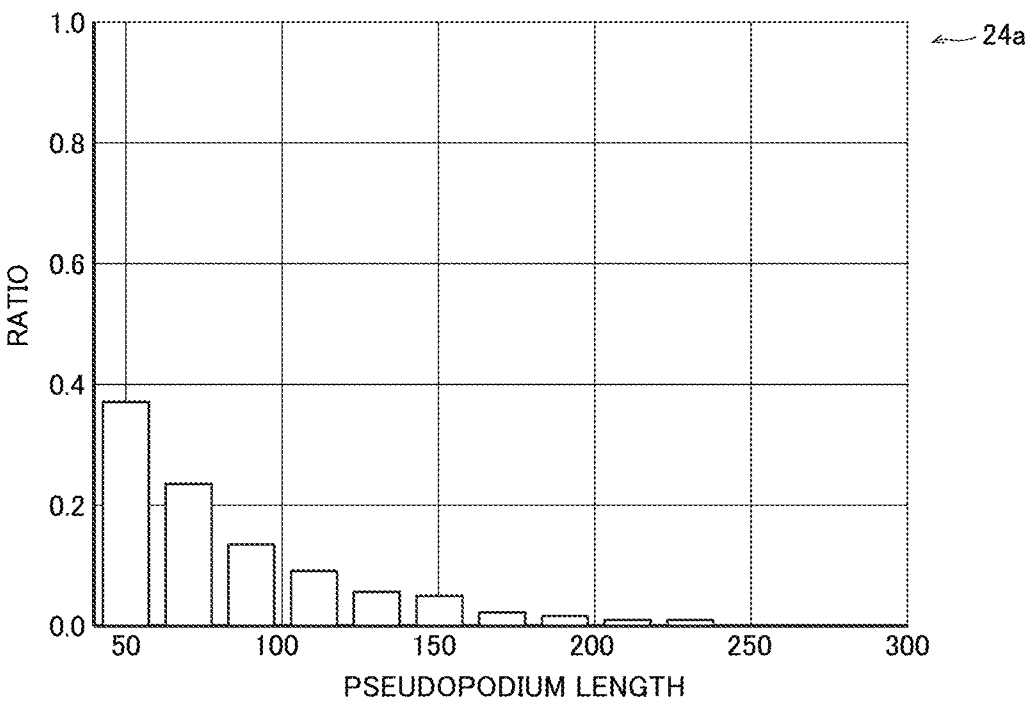
FIG. 10 is a diagram illustrating distribution of lengths of pseudopodia.

FIG. 10 is a view showing an exemplary distribution 24*a* of lengths of the pseudopodia 90*b* (see FIG. 2). The distribution 24*a* of lengths of the pseudopodia 90*b* is a histogram (frequency distribution) showing a length of the pseudopodium 90*b* on a horizontal axis, and a ratio (existence ratio of each length of the pseudopodium 90*b*) on a vertical axis. The ratio of the pseudopodia 90*b* whose length is not smaller than 100 μm increases as the cells 90 are (see FIG. 2) becoming closer to an aged state. That is, degrees of aging of the cells 90 can be visually grasped by seeing the distribution 24*a* of lengths of the pseudopodia 90*b*.

<Generation of Superimposed Cell Image>

In step S7 of FIG. 4, the superimposed-cell-image generator 15 generates the superimposed cell image 80 based on the cell image 30 and the lengths of the pseudopodia 90*b*. The processes of generating superimposed cell image 80 are described in detail with reference to FIG. 11.

In this embodiment, step of generating the superimposed cell image 80 includes step S7*a* of acquiring the cell image 30, step S7*b* of acquiring the cell areas 91, step S7*c* of acquiring lengths of the pseudopodia 90*b*, step S7*d* to forming the minimum bounding rectangles 71 in different indication forms, step S7*e* of generating the superimposed cell image 80, step S7*f* of storing the superimposed cell image 80.

In step S7*a*, the superimposed-cell-image generator 15 acquires the cell image 30. Specifically, the superimposed-cell-image generator 15 acquires the cell image 30 from the storage 20.

In step S7*b*, the superimposed-cell-image generator 15 acquires the cell areas 91. Specifically, the superimposed-cell-image generator 15 acquires the cell areas 91 by acquiring the cell area image 31 from the storage 20.

In step S7*c*, the superimposed-cell-image generator 15 acquires lengths of the pseudopodia 90*b*. Specifically, the superimposed-cell-image generator 15 acquires the superimposed image 37 on which the minimum bounding rectangles 71 are superimposed from the storage 20. The superimposed-cell-image generator 15 acquires the lengths of the pseudopodia 90*b* by acquiring lengths of long sides of the minimum bounding rectangles 71 in the image 37.

In step S7*d*, the superimposed-cell-image generator 15 forms the minimum bounding rectangles 71 in different indication forms. In this embodiment, the superimposed-cell-image generator 15 forms the minimum bounding rectangles 71 in different indication forms depending on the lengths of the areas 92 of the pseudopodia 90*b*. the superimposed-cell-image generator 15 forms the pseudopodia 90*b* whose length is not smaller than a predetermined length, and the pseudopodia 90*b* whose length is smaller than the predetermined length in different indication forms.

In step S7*e*, the superimposed-cell-image generator 15 generates the superimposed cell image 80 by superimposing the cell area 91, the areas 92 of the pseudopodia 90*b*, and the minimum bounding rectangles 71, which are formed in different indication forms, on the cell image 30. That is, in this embodiment, the superimposed-cell-image generator 15 is configured to superimpose the minimum bounding rectangles 71, which are formed in different indication forms, as the indices 70. Specifically, the indices 70 that are superimposed on the pseudopodium 90*b* whose length is not smaller than 40 μm, the indices 70 that are superimposed on the pseudopodium 90*b* whose length is not smaller than 60 μm, and the indices 70 that are superimposed on the pseudopodium 90*b* whose length is not smaller than 100 μm are indicated in different indication forms in the superimposed cell image 80.

The superimposed-cell-image generator 15 indicates the indices 70 in different indication forms by assigning different colors to the indices 70 depending on the lengths of the pseudopodia 90*b*. For example, the superimposed-cell-image generator 15 superimposes the green indices 70 on the pseudopodia 90*b* whose length is not smaller than 40 μm. Also, the superimposed-cell-image generator 15 superimposes the blue indices 70 on the pseudopodia 90*b* whose length is not smaller than 60 μm. For example, the superimposed-cell-image generator 15 superimposes the red indices 70 on the pseudopodia 90*b* whose length is not smaller than 100 μm. Accordingly, operators can grasp the lengths of the pseudopodia 90*b* by seeing the minimum bounding rectangles 71. In exemplary indications shown in FIG. 11, the green indices 70 are indicated by solid lines, the blue indices 70 are indicated by dashed lines, the red indices 70 are indicated by thick lines as shown in legends 41. In the exemplary indications shown in FIG. 11, although the indices 70 are superimposed not on all the pseudopodia 90*b* for ease of illustration, the indices 70 are actually superimposed on the pseudopodia 90*b* whose length is not smaller than 40 μm in accordance with their lengths.

In addition, the superimposed-cell-image generator 15 superimposes the cell areas 91 and the areas 92 of the pseudopodia 90*b* in indication forms different from each other on the cell image 30. The superimposed-cell-image generator 15 displays the cell areas 91 in blue, and the areas 92 of the pseudopodia 90*b* in green, for example. Accordingly, operators can distinguish between the cell areas 91, and the areas 92 of the pseudopodia 90*b* in the superimposed cell image 80. In the exemplary indications shown in FIG. 11, the different colors of the cell areas 91, and the areas 92 of the pseudopodia 90*b* are indicated by different hatching patterns as shown in legends 42.

In step S7*f*, the superimposed-cell-image generator 15 stores the superimposed cell image 80 in the storage 20.

<Storage and Output of Aging Index Information and Superimposed Cell Image>

In step S8 in FIG. 4, the processor 10 transmits the aging index information 24 and the superimposed cell image 80 to the computer 110 through the network 130.

Figure 12:
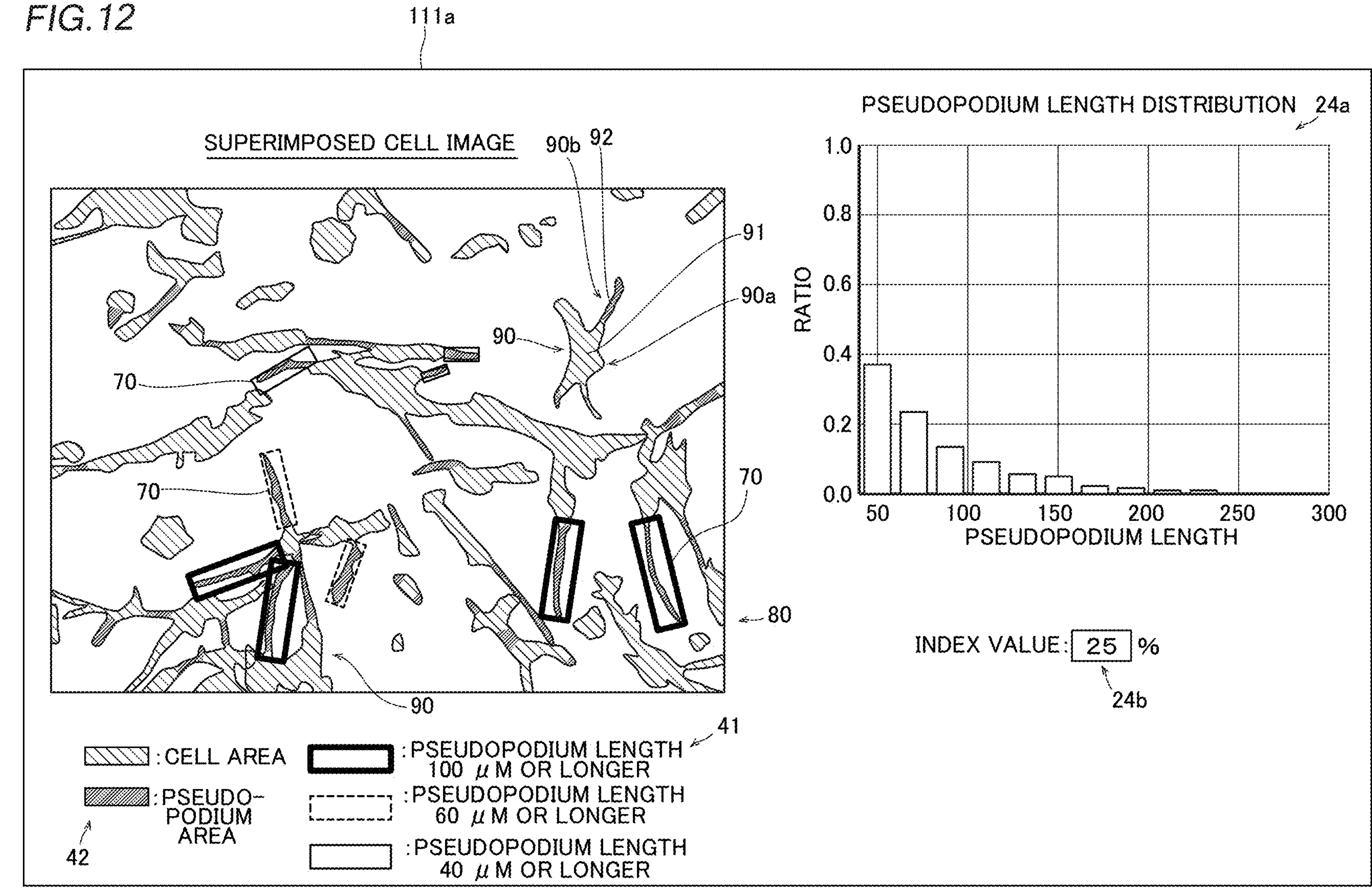
FIG. 12 is a view showing an exemplary screen showing the aging index information and the superimposed cell image on a display.

The display 111 displays at least one of the distribution 24*a* of the lengths of the pseudopodia 90*b*, and the index value 24*b*. In this embodiment, as shown in FIG. 12, the display 111 displays both the distribution 24*a* of lengths of the pseudopodia 90*b*, and the index value 24*b* on a display screen 111*a*. In this embodiment, the display 111 displays the superimposed cell image 80 in addition to the distribution 24*a* of the lengths of the pseudopodia 90*b*, and the index value 24*b*.

Finally, the cell image analysis method executed by the cell image analysis apparatus 100 according to this embodiment is completed.

Advantages of the Embodiment

In this embodiment, the following advantages are obtained.

In this embodiment, as described above, the cell image analysis system 200 includes a cell image acquirer 11 configured to acquire a cell image 30 including cells 90; a cell area acquirer 12 configured to acquire cell areas 91 from the cell image 30; a pseudopodium area acquirer 13 configured to acquire areas 92 of pseudopodia 90*b* that are elongated areas in the cell areas 91 of the cell image 30; and an aging index information acquirer 14 configured to acquire aging index information 24 that indicates a degree of aging of the cells 90 based lengths of pseudopodia 90*b*.

Accordingly, dissimilar to a configuration that analyzes a degree of aging of cells 90 based on types and amounts of miRNA (microRNA) contained in supernatant of cultivation solution for cultivating cells 90, because the aging index information 24 that indicates a degree of aging of the cells 90 based lengths of the pseudopodia 90*b* included in the cell image 30 can be acquired, a degree of aging of cells 90 can be acquired based on the cell image 30 without extracting miRNA from the supernatant. Consequently, it is possible to easily and speedily analyze a degree of aging of the cells 90 by acquiring the cell image 30.

In this embodiment, as described above, the cell image analysis apparatus 100 includes a cell image acquirer 11 configured to acquire a cell image 30 including cells 90; a cell area acquirer 12 configured to acquire cell areas 91 from the cell image 30; a pseudopodium area acquirer 13 configured to acquire areas 92 of pseudopodia 90*b* that are elongated areas in the cell areas 91 of the cell image 30; and an aging index information acquirer 14 configured to acquire aging index information 24 that indicates a degree of aging of the cells 90 based lengths of pseudopodia 90*b*.

Accordingly, similar to the aforementioned cell image analysis system 200, it is possible to provide a cell image analysis apparatus 100 capable of easily and speedily analyzing a degree of aging of the cells 90.

In this embodiment, as described above, a cell image analysis method includes a step of acquiring a cell image 30 including cells 90; a step of acquiring cell areas 91 from the cell image 30; a step of acquiring areas 92 of pseudopodia 90*b* in the cell areas 91; and a step of acquiring aging index information 24 that indicates a degree of aging of the cells 90 based lengths of pseudopodia 90*b*.

Accordingly, similar to the aforementioned cell image analysis system 200, it is possible to provide a cell image analysis method capable of easily and speedily analyzing a degree of aging of the cells 90.

In addition, following additional advantages can be obtained by the aforementioned embodiment added with configurations discussed below.

That is, in this embodiment, as described above, a display 111 configured to display the aging index information 24 is further provided. Accordingly, because the aging index information 24 is displayed on the display 111, it is possible to show the aging index information 24 to operators. Consequently, operators can easily grasp a degree of aging of the cells 90 included in the cell image 30 by visually recognizing the aging index information 24.

Also, in this embodiment, as described above, the aging index information acquirer 14 is configured to acquire the aging index information 24 based on the pseudopodia 90*b* whose length is not smaller than a predetermined length. Accordingly, a thin part of the cell 90 that becomes thinner due to overlapping of cells, a part of the cell 90 separated from the main body 90*a* of the cell 90, the dead cell 90, etc. can be excluded from the pseudopodia 90*b* that are used to acquire the aging index information 24 by acquiring the aging index information 24 based on the pseudopodia 90*b* whose length is not smaller than the predetermined length. Consequently, it is possible to prevent reduction of accuracy of the aging index information 24.

In this embodiment, as described above, the aging index information acquirer 14 is configured to acquire at least one of distribution 24*a* of lengths of the pseudopodia 90*b*, and an index value 24*b* that indicates a ratio of the pseudopodia 90*b* whose length is not smaller than a predetermined length to the pseudopodia 90*b* acquired; and the display 111 is configured to display at least one of the distribution 24*a* of the lengths of the pseudopodia 90*b*, and the index value 24*b*. Accordingly, in a case in which the distribution 24*a* of the lengths of the pseudopodia 90*b* is displayed on the display 111, degrees of aging of the cells 90 can be visually grasped based on the distribution 24*a* of lengths of the pseudopodia 90*b*. Also, in a case in which the index value 24*b* is displayed on the display 111, operators can quantitatively grasp a degree of aging based on a numerical value.

In this embodiment, as described above, the aging index information acquirer 14 is configured to acquire longitudinal lengths of the areas 92 of the pseudopodia 90*b* so as to acquire the lengths of the pseudopodia 90*b*. Accordingly, even if it is difficult to acquire the length of the pseudopodium 90*b* by using image processing, such as in a case of a undulating pseudopodium 90*b*, the longitudinal length of the area 92 of the pseudopodium 90*b* can be acquired as the length of the pseudopodium 90*b*.

In this embodiment, as described above, the aging index information acquirer 14 is configured to acquire longitudinal lengths L of the minimum bounding rectangles 71 of the areas 92 of the pseudopodia 90*b* so as to acquire the lengths of the areas 92 of the pseudopodia 90*b*. Accordingly, the longitudinal length of the area 92 of the pseudopodium 90*b* can be easily acquired by acquiring the minimum bounding rectangle 71.

In this embodiment, as described above, the pseudopodium area acquirer 13 is configured to acquire a pseudopodium removal image 32 by removing the pseudopodia 90*b* from the cell area 91 and to acquire the areas 92 of the pseudopodia 90*b* based on difference between the cell image 30 and the pseudopodium removal image 32. Accordingly, the areas 92 of the pseudopodia 90*b* can be easily acquired by acquiring the cell image 30 and the pseudopodium removal image 32.

In this embodiment, as described above, the pseudopodium area acquirer 13 is configured to acquire the pseudopodium removal image 32 by reducing and expanding the cell image 30. Accordingly, narrow and long areas in the image can be easily removed by using reduction processing that can remove narrow parts in the image and expansion processing that returns a size of the image reduced by the reduction processing to its original size. Consequently, it is possible to easily remove the pseudopodia 90*b*, which are elongated areas, from the cell image 30.

In this embodiment, as described above, the pseudopodium area acquirer 13 is configured to exclude, in the areas 92 of the pseudopodia 90*b*, the areas 92 of the pseudopodia 90*b* separated from the main bodies 90*a* of the cells 90 from subjects to be acquired for the aging index information 24. Accordingly, the aging index information 24 can be acquired based on the pseudopodia 90*b* that are connected to the main bodies 90*a* of the cells 90. As a result, because the aging index information 24 can be acquired based on the pseudopodia 90*b* of the living cells 90, it is possible to prevent reduction of accuracy of the aging index information 24.

In this embodiment, as described above, the pseudopodium area acquirer 13 is configured to exclude, in the areas 92 of pseudopodia 90*b* acquired, the areas 92 of pseudopodia 90*b* whose occupancy ratio to the cell area 91 is not smaller than a predetermined ratio from the subject to be acquired for the aging index information 24. Here, the pseudopodium 90*b* that is separated from the main body 90*a* of the cell 90 has a large occupancy ratio of the pseudopodium 90*b* to the cell area 91. For this reason, the pseudopodia 90*b* separated from the main bodies 90*a* of the cells 90 can be easily excluded from subjects to be acquired for the aging index information 24 by excluding the areas 92 of pseudopodia 90*b* whose occupancy ratio to the cell area 91 is not smaller than a predetermined ratio from the subject to be acquired for the aging index information 24 as described above, In this embodiment, as described above, the pseudopodium area acquirer 13 is configured to exclude, in the areas 92 of pseudopodia 90*b* acquired, the pseudopodia 90*b* that are in contact with edges of the cell image 30 from a subject to be acquired for the aging index information 24. Accordingly, it possible to exclude, from the subject to be acquired for the aging index information 24, the pseudopodium 90*b* whose length cannot be accurately acquired due to the contact with the edges of the cell image 30. Consequently, it is possible to prevent reduction of accuracy of the aging index information 24 caused by the pseudopodia 90*b* whose length cannot be accurately acquired.

In this embodiment, as described above, the cell area acquirer 12 is configured to acquire the cell areas 91 based on a learned model 23 having learned to acquire cell areas 91 by extracting areas of cytoskeletons from teacher images including cells 90, and the cell image 30. Accordingly, because the cell areas 91 can be acquired by the learned model 23, it possible to prevent a burden on operators from becoming larger as compared with a configuration in which operators visually acquires the cell areas 91.

In this embodiment, as described above, a superimposed-cell-image generator 15 configured to superimpose the cell area 91 and the areas 92 of the pseudopodia 90*b* on the cell image 30, and to superimpose indices 70 indicating the lengths of pseudopodia 90*b* on the areas 92 of pseudopodia 90*b* so as to generate a superimposed cell image 80. Accordingly, the cell areas 91 and the area 92 in the pseudopodium 90*b* can be easily grasped at a glance in the cell image 30 by seeing the superimposed cell image 80. Also, because the indices 70 indicating the lengths of the pseudopodia 90*b* are superimposed on the superimposed cell image 80, the lengths of the pseudopodia 90*b* can be easily grasped at a glance.

In this embodiment, as described above, the superimposed-cell-image generator 15 is configured to superimpose the indices 70 in different indication forms depending on the lengths of the areas 92 of the pseudopodia 90*b*. Accordingly, difference between the lengths of the pseudopodia 90*b* can be easily grasped by seeing indication forms of the indices 70.

In this embodiment, as described above, the superimposed-cell-image generator 15 is configured to superimpose the indices 70 corresponding to the pseudopodia 90*b* whose length is not smaller than a predetermined length and the indices corresponding to the pseudopodia 90*b* whose length is smaller than the predetermined length in different indication forms. Consequently, it is possible to easily grasp the pseudopodium 90*b* that are subjects to be acquired for the aging index information 24.

Modified Embodiments

Note that the embodiment disclosed this time must be considered as illustrative in all points and not restrictive. The scope of the present invention is not shown by the above description of the embodiments but by the scope of claims for patent, and all modifications (modified embodiments) within the meaning and scope equivalent to the scope of claims for patent are further included.

Figure 13:
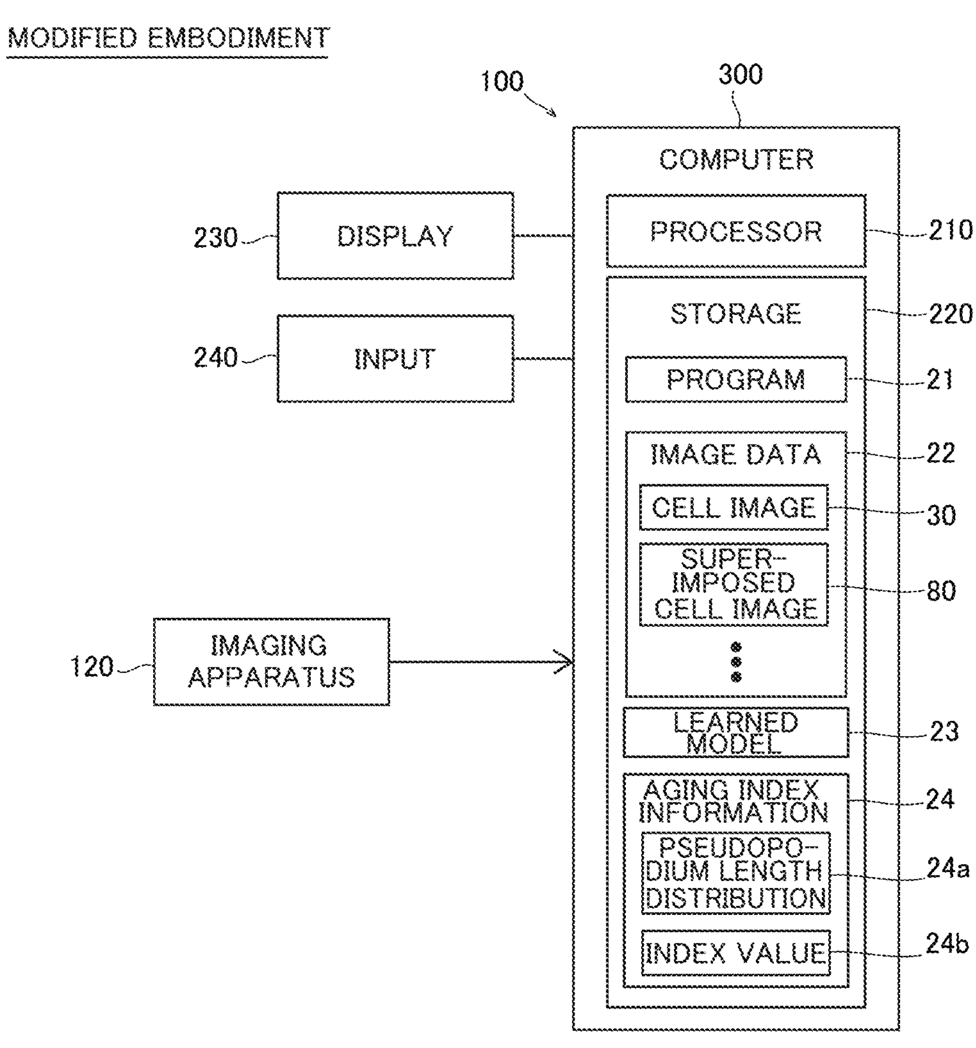
FIG. 13 is a block diagram showing a cell image analysis apparatus according to a modified embodiment.

While the example in which the cell image analysis apparatus 100 serves as a server in the cell image analysis system 200 constructed of a client-server model has been shown in the aforementioned embodiment, the present invention is not limited to this. In the present invention, alternatively the cell image analysis apparatus can be constructed of an independent computer, for example, as shown in FIG. 13. The cell image analysis apparatus 100 shown in FIG. 13 includes a computer 300 including a processor 210 and a storage 220. A display 230 and an input 240 are connected to the computer 300. The computer 300 is connected to and can communicate with an imaging apparatus 120. The processor 210 of the computer 300 includes the cell image acquirer 11, the cell area acquirer 12, the pseudopodium area acquirer 13, the aging index information acquirer 14, and superimposed-cell-image generator 15 shown in the aforementioned embodiment (see FIG. 3) as functional blocks.

While the example in which the single processor 10 (210) is configured to execute all image processing functions (functions of the cell image acquirer 11, the cell area acquirer 12, the pseudopodium area acquirer 13, the aging index information acquirer 14, and the superimposed-cell-image generator 15) has been shown in the aforementioned embodiment and in the modified embodiment shown in FIG. 13, the present invention is not limited to this. Alternatively, a plurality of processors can share the processes applied to the cell image 30. Alternatively, each process can be executed by one of the processors. The plurality of processors can be included in independent computers. In other words, the cell image analysis apparatus 100 can be constructed of a plurality of computers for executing image processing.

While the example in which the cell image analysis system 200 includes the display 111 has been shown in the aforementioned embodiment, the present invention is not limited to this. For example, the cell image analysis system 200 does not necessarily include the display 111. In a case in which the cell image analysis system 200 does not necessarily include the display 111, the processor 10 can be configured to output the aging index information 24 and the superimposed cell image 80 to an external display.

While the example in which the aging index information acquirer 14 is configured to acquire the aging index information 24 based on the pseudopodia 90*b* whose length is not smaller than a predetermined length has been shown in the aforementioned embodiment, the present invention is not limited to this. For example, alternatively, the aging index information acquirer 14 can be configured to acquire the aging index information 24 based all the pseudopodia 90*b* acquired by the pseudopodium area acquirer 13. However, if the cells 90 overlap each other, an area that is not actually the pseudopodium 90*b* is sometimes acquired as the areas 92 of the pseudopodia 90*b* that are acquired by the pseudopodium area acquirer 13. In other words, an area other than the pseudopodium 90*b* is sometimes acquired as the areas 92 of the pseudopodia 90*b* that are acquired by the pseudopodium area acquirer 13. Accordingly, in a case in which the aging index information acquirer 14 is configured to acquire the aging index information 24 based all the pseudopodia 90*b*, accuracy of the aging index information 24 can be sometimes reduced. For this reason, it is preferable that the aging index information acquirer 14 is configured to acquire the aging index information 24 based on the pseudopodia 90*b* whose length is not smaller than a predetermined length.

While the example in which the aging index information acquirer 14 is configured to acquire lengths of the minimum bounding rectangles 71 as lengths of the pseudopodia 90*b* has been shown in the aforementioned embodiment, the present invention is not limited to this. For example, alternatively, the aging index information acquirer 14 can be configured to acquire actual lengths of the pseudopodia 90*b*. However, in a case in which the aging index information acquirer 14 is configured to acquire the actual lengths of the pseudopodia 90*b*, processes of acquiring the lengths of the pseudopodia 90*b* will be complicated. For this reason, it is preferable that the aging index information acquirer 14 is configured to acquire lengths of the minimum bounding rectangles 71 as lengths of the pseudopodia 90*b*.

While the example in which the pseudopodium area acquirer 13 is configured to acquire the areas 92 of the pseudopodia 90*b* based on difference between the cell image 30 and the pseudopodium removal image 32 has been shown in the aforementioned embodiment, the present invention is not limited to this. The technique for acquiring the area 92 of the pseudopodium 90*b* by using the pseudopodium area acquirer 13 is not limited as long as it can acquire the area 92 of the pseudopodium 90*b*.

While the example in which the pseudopodium area acquirer 13 is configured to acquire the areas 92 of the pseudopodia 90*b* by reducing and expanding the cell image 30 has been shown in the aforementioned embodiment, the present invention is not limited to this. The technique for acquiring the area 92 of the pseudopodium 90*b* by using the pseudopodium area acquirer 13 is not limited as long as it can acquire the area 92 of the pseudopodium 90*b*.

While the example in which the pseudopodium area acquirer 13 is configured to execute four reduction processes and then execute four expansion processes has been shown in the aforementioned embodiment, the present invention is not limited to this. The numbers of reduction processes and expansion processes executed by the pseudopodium area acquirer 13 can be set in accordance with a width of the pseudopodium 90*b* to be removed for the pseudopodium removal image 32.

While the example in which the pseudopodium area acquirer 13 is configured to exclude the pseudopodia 90*b* separated from the main bodies 90*a* of the cells 90 has been shown in the aforementioned embodiment, the present invention is not limited to this. For example, the pseudopodium area acquirer 13 does not necessarily exclude the pseudopodium 90*b* separated from the main bodies 90*a* of the cells 90. However, in a case in which the pseudopodium area acquirer 13 does not exclude the pseudopodium 90*b* separated from the main bodies 90*a* of the cells 90, the pseudopodia 90*b* that are used to acquire the aging index information 24 will include the pseudopodium 90*b* of the dead cell 90 and/or a thin part of the cell 90 that becomes thinner due to overlapping of cells. For this reason, accuracy of the aging index information 24 generated will be reduced. For this reason, it is preferable that the pseudopodium area acquirer 13 is configured to exclude the pseudopodia 90*b* separated from the main bodies 90*a* of the cells 90.

While the example in which the pseudopodium area acquirer 13 is configured to exclude the pseudopodia 90*b* that are in contact with the edges of the cell image 30 has been shown in the aforementioned embodiment, the present invention is not limited to this. For example, the pseudopodium area acquirer 13 does not necessarily exclude the pseudopodia 90*b* that are in contact with the edges of the cell image 30. However, if the pseudopodium 90*b* are in contact with the edge of the cell image 30, it is difficult to accurately determine a shape of the minimum bounding rectangle 71. Accordingly, it becomes difficult to accurately acquire the length of the pseudopodium 90*b*. In a case in which the pseudopodium area acquirer 13 does not exclude the pseudopodia 90*b* that are in contact with the edges of the cell image 30, the pseudopodia 90*b* that are used to acquire the aging index information 24 will include the pseudopodium 90*b* whose length is inaccurate. For this reason, accuracy of the aging index information 24 generated will be reduced. From this viewpoint, it is preferable that the pseudopodium area acquirer 13 is configured to exclude the pseudopodia 90*b* that are in contact with the edges of the cell image 30.

While the example in which the cell image analysis system 200 (cell image analysis apparatus 100) includes the superimposed-cell-image generator 15 has been shown in the aforementioned embodiment, the present invention is not limited to this. For example, the cell image analysis system 200 (cell image analysis apparatus 100) does not necessarily include the superimposed-cell-image generator 15. However, in a case in which the cell image analysis system 200 (cell image analysis apparatus 100) does not include the superimposed-cell-image generator 15, the superimposed cell image 80 cannot be acquired. For this reason, it is preferable that the cell image analysis system 200 (cell image analysis apparatus 100) includes the superimposed-cell-image generator 15.

While the example in which the superimposed-cell-image generator 15 is configured to indicate the indices 70 in different indication forms depending on the lengths of the pseudopodia 90*b* has been shown in the aforementioned embodiment, the present invention is not limited to this. For example, the superimposed-cell-image generator 15 does not necessarily indicate the indices 70 in different indication forms depending on the lengths of the pseudopodia 90*b*. However, in a case in which the superimposed-cell-image generator 15 does not indicate the indices 70 in different indication forms depending on the lengths of the pseudopodia 90*b*, operators cannot easily grasp difference between the lengths of the pseudopodia 90*b* at a glance. For this reason, it is preferable that the superimposed-cell-image generator 15 indicates the indices 70 in different indication forms depending on the lengths of the pseudopodia 90*b*.

While the example in which the display 111 is configured to display the distribution 24*a* of the lengths of the pseudopodia 90*b*, the index value 24*b*, and the superimposed cell image 80 has been shown in the aforementioned embodiment, the present invention is not limited to this. For example, the display 111 does not necessarily display the distribution 24*a* of the lengths of the pseudopodia 90*b*, the index value 24*b*, and the superimposed cell image 80 if the display displays at least one of the distribution 24*a* of the lengths of the pseudopodia 90*b* and the index value 24*b*.

Modes

The aforementioned exemplary embodiment will be understood as concrete examples of the following modes by those skilled in the art.

(Mode Item 1)

A cell image analysis system includes a cell image acquirer configured to acquire a cell image including a cell(s); a cell area acquirer configured to acquire a cell area(s) from the cell image; a pseudopodium area acquirer configured to acquire an area(s) of a pseudopodium/pseudopodia that is/are an elongated area(s) in the cell area(s) of the cell image; and an aging index information acquirer configured to acquire aging index information that indicates a degree(s) of aging of the cell(s) based a length(s) of the pseudopodium/pseudopodia.

(Mode Item 2)

In the cell image analysis system according to mode item 1, a display configured to display the aging index information is further provided.

(Mode Item 3)

In the cell image analysis system according to mode item 2, the aging index information acquirer is configured to acquire the aging index information based pseudopodia whose length is not smaller than a predetermined length.

(Mode Item 4)

In the cell image analysis system according to mode item 3, the aging index information acquirer is configured to acquire at least one of distribution of lengths of the pseudopodia, and an index value that indicates a ratio of the pseudopodia whose length is not smaller than a predetermined length to the pseudopodia acquired; and the display is configured to display at least one of the distribution of lengths of the pseudopodia, and the index value.

(Mode Item 5)

In the cell image analysis system according to any of mode items 1 to 4, the aging index information acquirer is configured to acquire a longitudinal length(s) of the area(s) of the pseudopodium/pseudopodia so as to acquire the length(s) of the pseudopodium/pseudopodia.

(Mode Item 6)

In the cell image analysis system according to mode item 5, the aging index information acquirer is configured to acquire a longitudinal length(s) of a minimum bounding rectangle(s) of the area(s) of the pseudopodium/pseudopodia so as to acquire the length(s) of the area(s) of the pseudopodium/pseudopodia.

(Mode Item 7)

In the cell image analysis system according to any of mode items 1 to 6, the pseudopodium area acquirer is configured to acquire a pseudopodium removal image by removing the pseudopodium/pseudopodia from the cell area, and to acquire the area(s) of the pseudopodium/pseudopodia based on difference between the cell image and the pseudopodium removal image.

(Mode Item 8)

In the cell image analysis system according to mode item 7, the pseudopodium area acquirer is configured to apply reduction processing and expansion processing to the cell image so as to acquire the pseudopodium removal image.

(Mode Item 9)

In the cell image analysis system according to any of mode items 1 to 8, the pseudopodium area acquirer is configured to exclude, in the area(s) of the pseudopodium/pseudopodia acquired, the area(s) of the pseudopodium/pseudopodia that is/are separated from a main body of the cell from a subject to be acquired for the aging index information.

(Mode Item 10)

In the cell image analysis system according to mode item 9, the pseudopodium area acquirer is configured to exclude, in the area(s) of the pseudopodium/pseudopodia acquired, the area(s) of the pseudopodium/pseudopodia whose occupancy ratio to the cell area is not smaller than a predetermined ratio from the subject to be acquired for the aging index information.

(Mode Item 11)

In the cell image analysis system according to any of mode items 1 to 10, the pseudopodium area acquirer is configured to exclude, in the area(s) of the pseudopodium/pseudopodia acquired, the pseudopodium/pseudopodia that is/are in contact with an edge(s) of the cell image from a subject to be acquired for the aging index information.

(Mode Item 12)

In the cell image analysis system according to any of mode items 1 to 11, the cell area acquirer is configured to acquire the cell area based on a learned model having learned to acquire cell areas by extracting areas of cytoskeletons from teacher images including cells, and the cell image.

(Mode Item 13)

In the cell image analysis system according to any of mode items 1 to 12, a superimposed-cell-image generator configured to superimpose the cell area and the area(s) of the pseudopodium/pseudopodia on the cell image, and to superimpose an index/indices indicating the length(s) of the pseudopodium/pseudopodia on the area(s) of the pseudopodium/pseudopodia so as to generate a superimposed cell image is further provided.

(Mode Item 14)

In the cell image analysis system according to mode item 13, the superimposed-cell-image generator is configured to superimpose the indices in different indication forms depending on the lengths of the areas of the pseudopodia.

(Mode Item 15)

In the cell image analysis system according to mode item 14, the superimposed-cell-image generator is configured to superimpose the index/indices corresponding to the pseudopodium/pseudopodia whose length is not smaller than a predetermined length and the index/indices corresponding to the pseudopodium/pseudopodia whose length is smaller than the predetermined length in different indication forms.

(Mode Item 16)

A cell image analysis apparatus includes a cell image acquirer configured to acquire a cell image including a cell(s); a cell area acquirer configured to acquire a cell area(s) from the cell image; a pseudopodium area acquirer configured to acquire an area(s) of a pseudopodium/pseudopodia that is/are an elongated area(s) in the cell area(s) of the cell image; and; and an aging index information acquirer configured to acquire aging index information that indicates a degree(s) of aging of the cell(s) based a length(s) of the pseudopodium/pseudopodia.

(Mode Item 17)

A cell image analysis method includes a step of acquiring a cell image including a cell(s); a step of acquiring a cell area(s) from the cell image; a step of acquiring an area(s) of a pseudopodium/pseudopodia in the cell area(s); and a step of acquiring aging index information that indicates a degree (s) of aging of the cell(s) based a length(s) of the pseudopodium/pseudopodia.

DESCRIPTION OF REFERENCE NUMERALS

11; cell image acquirer
12; cell area acquirer
13; pseudopodium area acquirer
14; aging index information acquirer
15; superimposed-cell-image generator
23; learned model
24; aging index information
24*a*; distribution of lengths of pseudopodia
24*b*; index value
30; cell image
70; index
71; minimum bounding rectangle
80; superimposed cell image
90; cell
90*a*; main body of cell
90*b*; pseudopodium
91; cell area
92; area of pseudopodium
100; cell image analysis apparatus
200; cell image analysis system
L; longitudinal length of minimum bounding rectangle

The invention claimed is:

1. A cell image analysis system comprising:

a cell image acquirer configured to acquire a cell image including a cell(s);

a cell area acquirer configured to acquire a cell area(s) from the cell image;

a pseudopodium area acquirer configured to acquire an area(s) of a pseudopodium/pseudopodia that is/are an elongated area/areas in the cell area(s) of the cell image; and an aging index information acquirer configured to acquire aging index information that indicates a degree(s) of aging of the cell(s) based a length(s) of the pseudopodium/pseudopodia, wherein the pseudopodium area acquirer is configured to exclude, in the area(s) of the pseudopodium/pseudopodia acquired, the area(s) of the pseudopodium/pseudopodia that is/are separated from a main body of the cell from a subject to be acquired for the aging index information.

2. The cell image analysis system according to claim 1 further comprising a display configured to display the aging index information.

3. The cell image analysis system according to claim 2, wherein the aging index information acquirer is configured to acquire the aging index information based pseudopodia whose length is not smaller than a predetermined length.

4. The cell image analysis system according to claim 3, wherein the aging index information acquirer is configured to acquire at least one of distribution of lengths of the pseudopodia, and an index value that indicates a ratio of the pseudopodia whose length is not smaller than a predetermined length to the pseudopodia acquired; and the display is configured to display at least one of the distribution of lengths of the pseudopodia, and the index value.

5. The cell image analysis system according to claim 1, wherein the aging index information acquirer is configured to acquire a longitudinal length(s) of the area(s) of the pseudopodium/pseudopodia so as to acquire the length(s) of the pseudopodium/pseudopodia.

6. The cell image analysis system according to claim 5, wherein the aging index information acquirer is configured to acquire a longitudinal length(s) of a minimum bounding rectangle(s) of the area(s) of the pseudopodium/pseudopodia so as to acquire the length(s) of the area(s) of the pseudopodium/pseudopodia.

7. The cell image analysis system according to claim 1, wherein the pseudopodium area acquirer is configured to acquire a pseudopodium removal image by removing the pseudopodium/pseudopodia from the cell area, and to acquire the area(s) of the pseudopodium/pseudopodia based on difference between the cell image and the pseudopodium removal image.

8. The cell image analysis system according to claim 7, wherein the pseudopodium area acquirer is configured to apply reduction processing and expansion processing to the cell image so as to acquire the pseudopodium removal image.

9. The cell image analysis system according to claim 1, wherein the pseudopodium area acquirer is configured to exclude, in the area(s) of the pseudopodium/pseudopodia acquired, the area(s) of the pseudopodium/pseudopodia whose occupancy ratio to the cell area is not smaller than a predetermined ratio from the subject to be acquired for the aging index information.

10. The cell image analysis system according to claim 1, wherein the pseudopodium area acquirer is configured to exclude, in the area(s) of the pseudopodium/pseudopodia acquired, the pseudopodium/pseudopodia that is/are in contact with an edge(s) of the cell image from a subject to be acquired for the aging index information.

11. The cell image analysis system according to claim 1, wherein the cell area acquirer is configured to acquire the cell area based on a learned model having learned to acquire cell areas by extracting areas of cytoskeletons from teacher images including cells, and the cell image.

12. The cell image analysis system according to claim 1 further comprising a superimposed-cell-image generator configured to superimpose the cell area and the area(s) of the pseudopodium/pseudopodia on the cell image, and to superimpose an index/indices indicating the length(s) of the pseudopodium/pseudopodia on the area(s) of the pseudopodium/pseudopodia so as to generate a superimposed cell image.

13. The cell image analysis system according to claim 12, wherein the superimposed-cell-image generator is configured to superimpose the indices in different indication forms depending on the lengths of the areas of the pseudopodia.

14. The cell image analysis system according to claim 13, wherein the superimposed-cell-image generator is configured to superimpose the index/indices corresponding to the pseudopodium/pseudopodia whose length is not smaller than a predetermined length and the index/indices corresponding to the pseudopodium/pseudopodia whose length is smaller than the predetermined length in different indication forms.

15. A cell image analysis apparatus comprising:

a cell image acquirer configured to acquire a cell image including a cell(s);

a cell area acquirer configured to acquire a cell area(s) from the cell image;

a pseudopodium area acquirer configured to acquire an area(s) of a pseudopodium/pseudopodia that is/are an elongated area(s) in the cell area(s) of the cell image; and an aging index information acquirer configured to acquire aging index information that indicates a degree(s) of aging of the cell(s) based a length(s) of the pseudopodium/pseudopodia, wherein the pseudopodium area acquirer is configured to exclude, in the area(s) of the pseudopodium/pseudopodia acquired, the area(s) of the pseudopodium/pseudopodia that is/are separated from a main body of the cell from a subject to be acquired for the aging index information.

16. A cell image analysis method comprising:

a step of acquiring a cell image including a cell(s);

a step of acquiring a cell area(s) from the cell image;

a step of acquiring an area(s) of a pseudopodium/pseudopodia in the cell area(s);

a step of acquiring aging index information that indicates a degree(s) of aging of the cell(s) based a length(s) of the pseudopodium/pseudopodia; and a step of excluding, in the area(s) of the pseudopodium/pseudopodia acquired, the area(s) of the pseudopodium/pseudopodia that is/are separated from a main body of the cell from a subject to be acquired for the aging index information.

* * * * *